(12) United States Patent
Ogata et al.

(10) Patent No.: US 8,605,994 B2
(45) Date of Patent: Dec. 10, 2013

(54) STEREOSCOPIC IMAGE DISPLAY SYSTEM, DISPARITY CONVERSION DEVICE, DISPARITY CONVERSION METHOD AND PROGRAM

(75) Inventors: Masami Ogata, Kanagawa (JP); Takafumi Morifuji, Tokyo (JP); Suguru Ushiki, Tokyo (JP)

(73) Assignee: Sony Corporation, Tokyo (JP)

( * ) Notice: Subject to any disclaimer, the term of this patent is extended or adjusted under 35 U.S.C. 154(b) by 104 days.

(21) Appl. No.: 13/386,166

(22) PCT Filed: May 25, 2011

(86) PCT No.: PCT/JP2011/061972
§ 371 (c)(1),
(2), (4) Date: Jan. 20, 2012

(87) PCT Pub. No.: WO2011/155330
PCT Pub. Date: Dec. 15, 2011

(65) Prior Publication Data
US 2012/0148147 A1    Jun. 14, 2012

(30) Foreign Application Priority Data
Jun. 7, 2010   (JP) ................................ P2010-129507

(51) Int. Cl.
*G06K 9/00*   (2006.01)
(52) U.S. Cl.
USPC .......................................................... 382/154
(58) Field of Classification Search
None
See application file for complete search history.

(56) References Cited

U.S. PATENT DOCUMENTS 6,466,255 B1 * 10/2002  Kagita et al. .................. 348/42
2005/0190180 A1   9/2005  Jin et al.
(Continued)

FOREIGN PATENT DOCUMENTS

| EP | 1 089 573 A2 | 4/2001 |
|---|---|---|
| JP | 9-27969 | 1/1997 |

(Continued)

OTHER PUBLICATIONS

Extended European Search Report issued May 16, 2013 by European Patent Office in corresponding International Application No. PCT/JP2011/061972 (6 pages).

*Primary Examiner* — Stephen R Koziol
*Assistant Examiner* — Delomia Gilliard
(74) *Attorney, Agent, or Firm* — Finnegan, Henderson, Farabow, Garrett & Dunner, LLP

(57) ABSTRACT

Disparity in a stereoscopic image is converted, according to features of a configuration element of an image that influences depth perception of a stereoscopic image. A disparity detecting unit 110 detects disparity from a left image L and right image R of an input image, and generates a disparity map dM. A disparity correction unit 150 corrects the disparity in the disparity map dM and generates a corrected disparity map dM'. A correction feature setting unit 130 sets the correction features in the event of performing disparity correction in the disparity correction unit 150. The image synthesizing unit 160 synthesizes the left image L and right image R of the stereoscopic image based on the corrected disparity map dM' and outputs the stereoscopic image made up of a left image L' and right image R' as an output image. Thus, a stereoscopic image having disparity according to the set correction features is output. The correction features therein are set according to the degree that the configuration element features such as size of disparity, position on screen, manner of special change and so forth influence the depth perception.

13 Claims, 28 Drawing Sheets

(56) References Cited

U.S. PATENT DOCUMENTS

| | | |
|---|---|---|
| 2006/0045329 A1 | 3/2006 | Jones et al. |
| 2006/0215903 A1* | 9/2006 | Nishiyama ............... 382/154 |
| 2007/0024620 A1* | 2/2007 | Muller-Fischer et al. .... 345/427 |
| 2007/0247522 A1 | 10/2007 | Holliman |
| 2008/0112626 A1 | 5/2008 | Sun et al. |
| 2008/0199070 A1* | 8/2008 | Kim et al. ............... 382/154 |
| 2010/0039504 A1 | 2/2010 | Takahashi et al. |
| 2010/0315488 A1* | 12/2010 | Kim et al. ............... 348/46 |
| 2011/0091096 A1* | 4/2011 | Morris et al. ............... 382/154 |
| 2011/0142309 A1* | 6/2011 | Zhang et al. ............... 382/128 |

FOREIGN PATENT DOCUMENTS

| | | |
|---|---|---|
| JP | 2000-209614 | 7/2000 |
| JP | 2003-209858 | 7/2003 |
| JP | 2004-221699 | 8/2004 |
| JP | 2005-91508 | 4/2005 |
| WO | WO 2009/139740 A1 | 9/2009 |
| WO | WO 2009-139740 A1 | 11/2009 |

* cited by examiner

FIG. 4
(a)
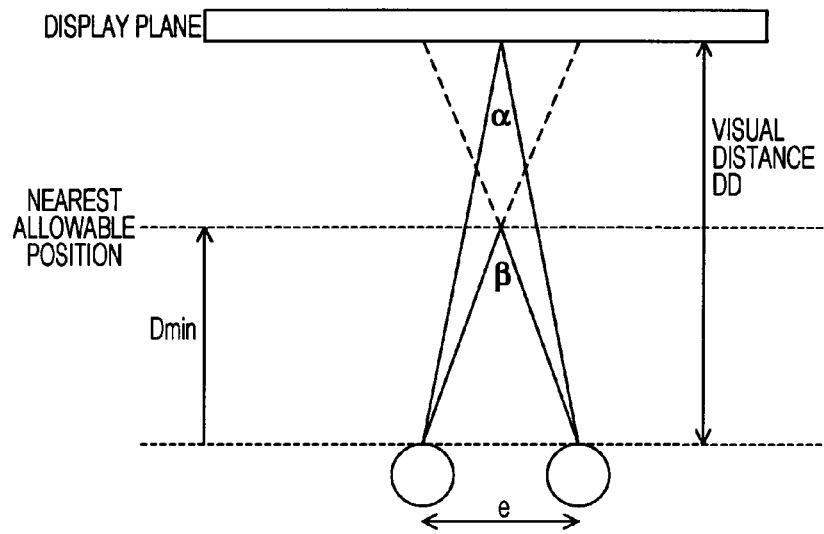
(b)
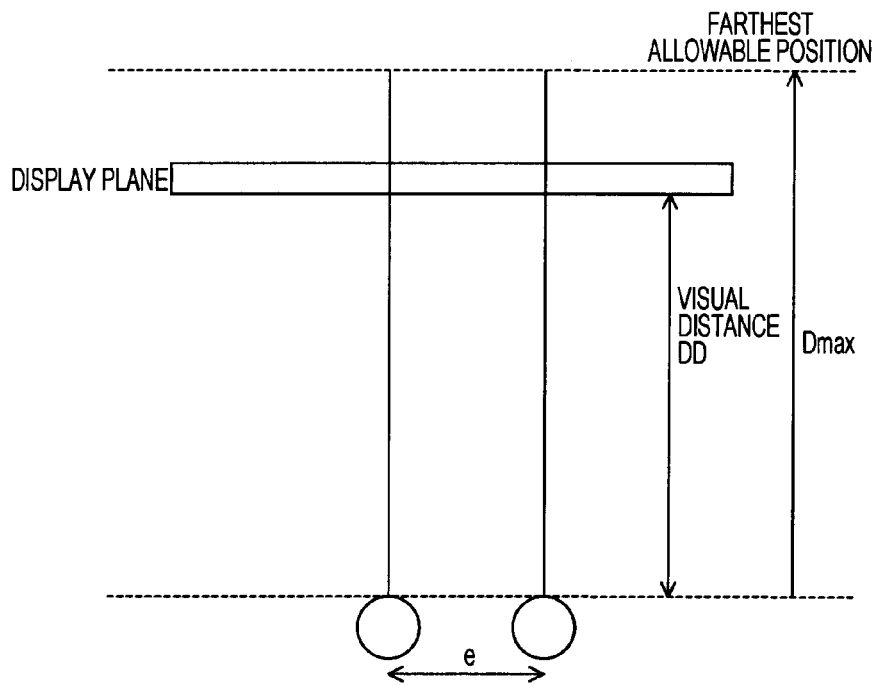

FIG. 10
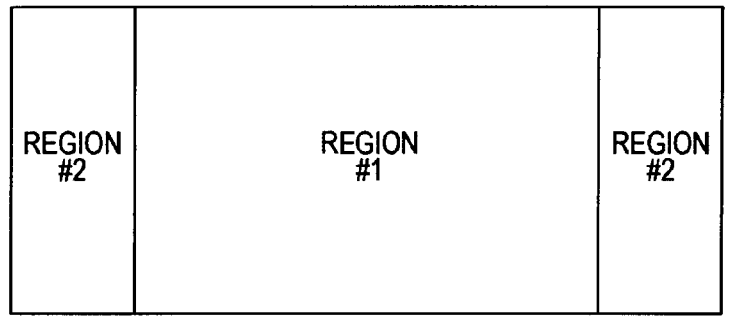
(a) DISPARITY MAP dM
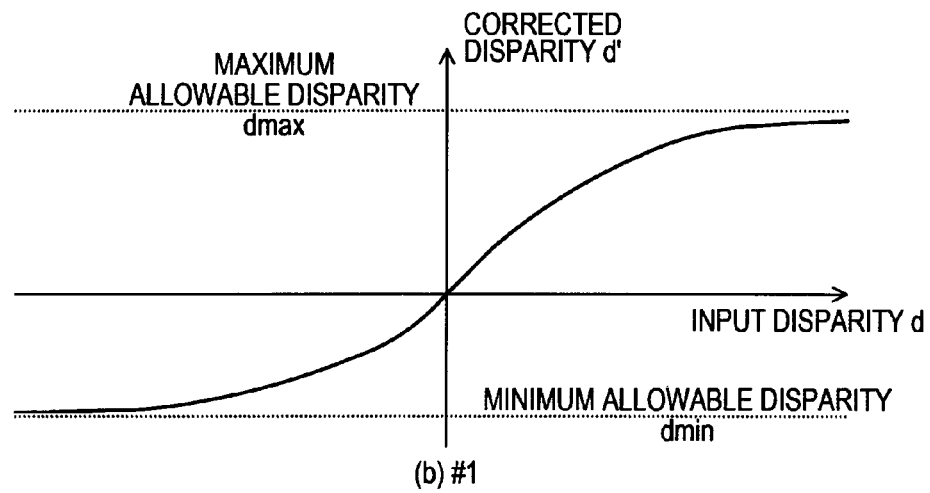
(b) #1
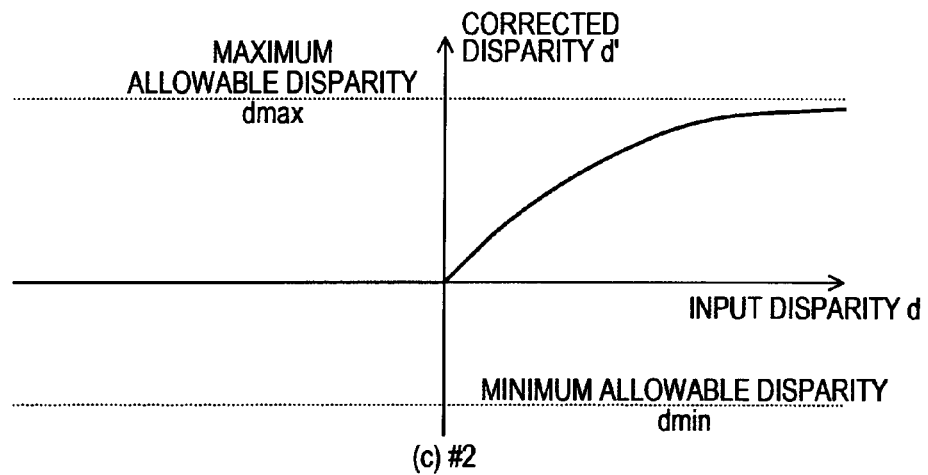
(c) #2

FIG. 16
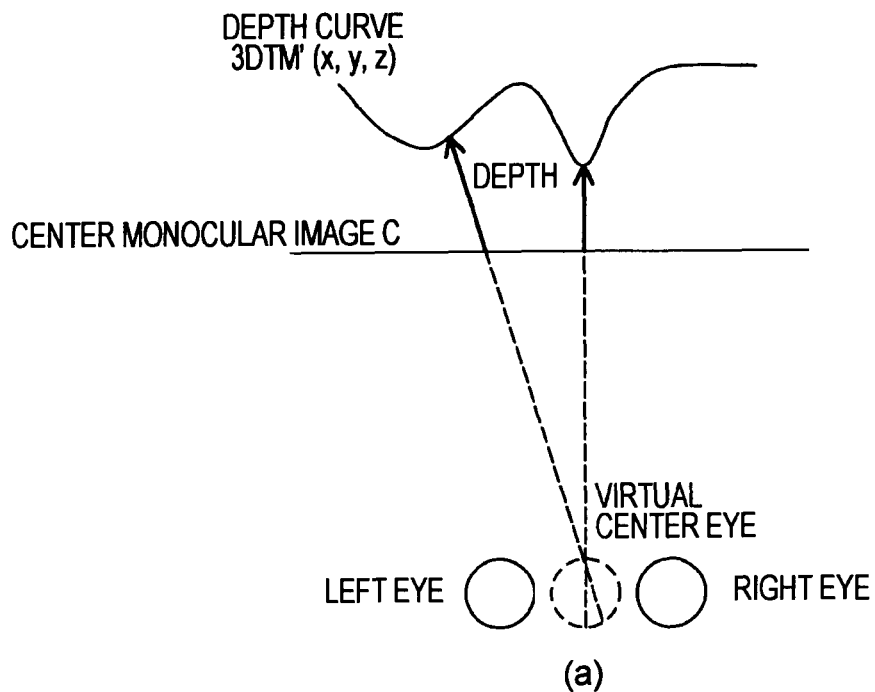
(a)
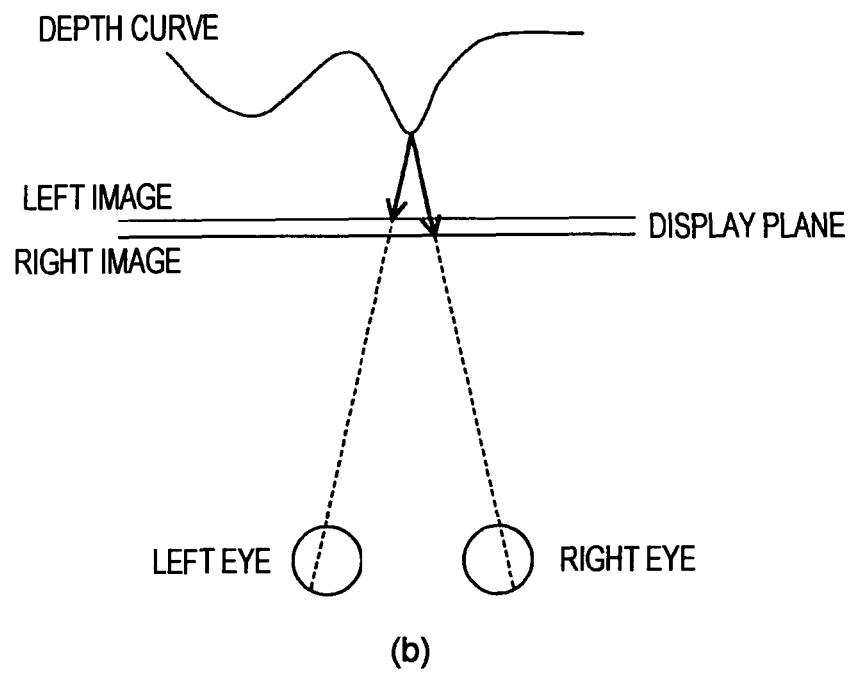
(b)

FIG. 25
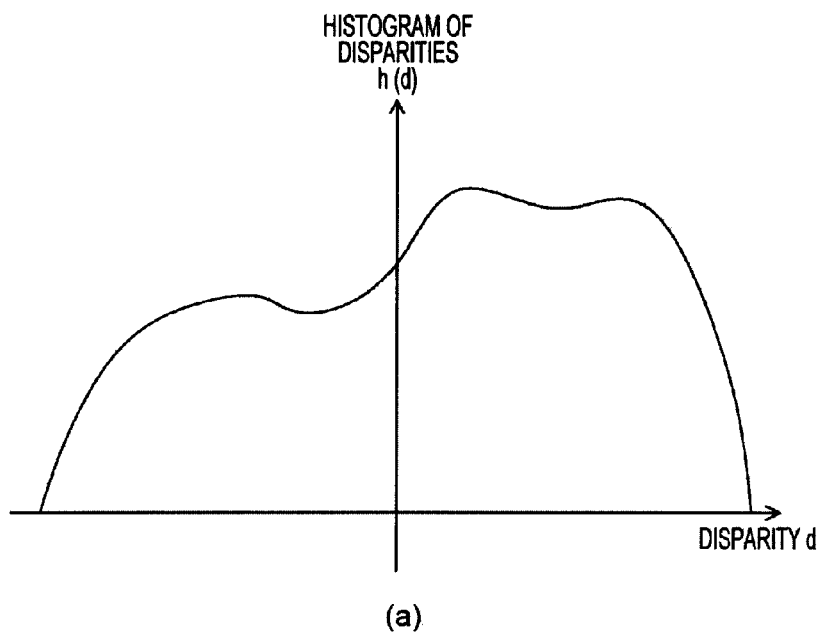
(a)
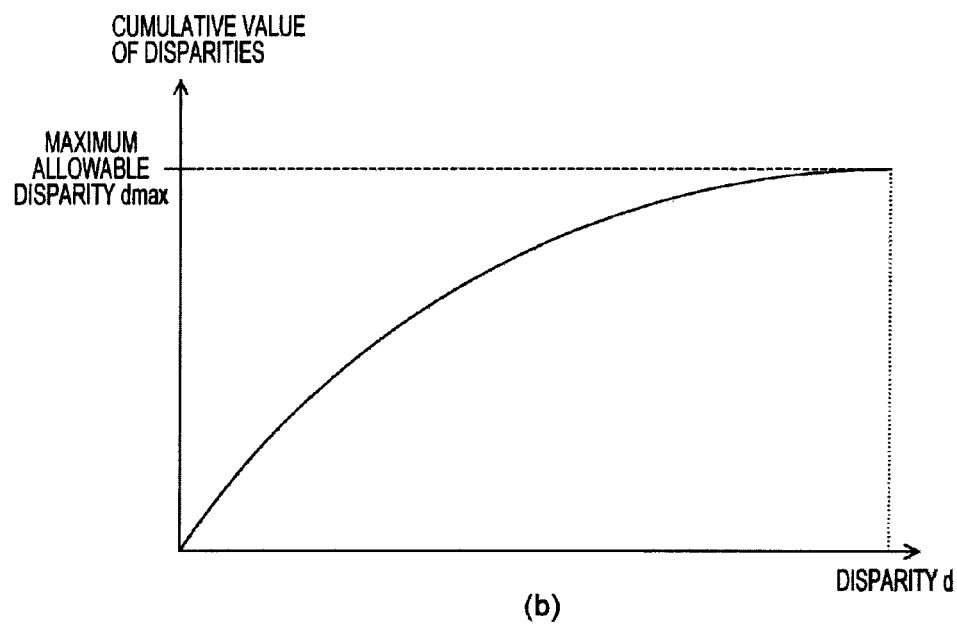
(b)

STEREOSCOPIC IMAGE DISPLAY SYSTEM, DISPARITY CONVERSION DEVICE, DISPARITY CONVERSION METHOD AND PROGRAM

TECHNICAL FIELD

The present invention relates to a stereoscopic image display system, and particularly relates to a disparity conversion device that converts disparity in a stereoscopic image, a stereoscopic image display system, and processing method thereof, and a program that causes a computer to execute this method.

BACKGROUND ART

Recently, techniques to display stereoscopic images with an image display device have been used. In the event of viewing such stereoscopic images displayed on an image display device, even when the angle of convergence is similar to the real world, focal distance may be different, becoming a factor causing visual fatigue. Particularly, in a case wherein a portion within the screen pops out excessively, or an object unnecessarily pops out during moving picture display and so forth, great visual changes are a burden to the viewer.

Therefore, conventionally, in order to perform natural stereoscopic displaying, a stereoscopic image display device has been proposed that displays so that the display position of the stereoscopic image is within the focal depth of the observer (for example, see PTL 1.). With this conventional stereoscopic image display device, the depth distance to be displayed is non-linearly converted to a depth distance of the display position of the stereoscopic image.

CITATION LIST

Patent Literature

PTL 1: Japanese Unexamined Patent Application Publication No. 2005-091508 (FIG. 6)

SUMMARY OF INVENTION

Technical Problem

With the above-described conventional technique, by non-linearly converting the depth distance to be displayed to the depth distance of the display position of the stereoscopic image, the display position of the stereoscopic image is adjusted to be within the focal depth of an observer. However, there are cases wherein not only is the depth distance itself to be directly adjusted, but indirectly adjusting various types of elements influencing depth perception may also be desired.

The present invention is made with consideration for such situations, and is intended to convert disparity of a stereoscopic image according to features of the configuration elements of an image which influences depth perception of a stereoscopic image.

Solution to Problem

The present invention has been made to solve the above-described problems, and a first aspect thereof is a disparity conversion device having a disparity detecting unit that detects disparity from a left image and right image of an input image, and generates a disparity map that holds the disparity for each pixel or pixel group; a correction feature setting unit that sets correction features in the event of correcting the disparity in the disparity map; a disparity correction unit that corrects the disparity in the disparity map according to the set correction features and generates a corrected disparity map; and an image synthesizing unit that synthesizes a left image and right image of an output image from the left image and right image of the input image according to the corrected disparity map, and a disparity conversion method having processing procedures for each of these units, and a program that causes a computer to execute these various procedures. This yields the effects of synthesizing the left image and right image based on the corrected disparity map subjected to disparity correction according to set correction features.

Also, according to the first aspect herein, a region setting unit that sets at least two regions in the disparity map may be further provided; wherein the correction feature setting unit sets the correction features by each of the at least two regions; and the disparity correction unit corrects the disparity in the disparity map according to the correction feature according to the at least two regions in the disparity map. This yields the effects of correcting the disparity according to correction features that have been set for each region.

Also, according to the first aspect herein, the disparity correction unit may correct the disparity in the disparity map according to a weighted sum of the correction features according to adjacent regions, in predetermined buffer regions of which the at least two regions are adjacent. This yields the effects of avoiding discontinuity between regions.

Also, according to the first aspect herein, the correction feature setting unit may set the correction features so that, in a region corresponding to the left and right edges of the disparity map of the at least two region, depth in the forward direction is suppressed. This yields the effects of avoiding unnatural popping out in the left and right edges, thus resolving discomfort to the observer (shielding conflict).

Also, according to the first aspect herein, the correction feature setting unit may set the correction features for each of at least two components in the disparity map; with the disparity correction unit including a component dividing unit that divides the disparity map into each of the component, a component disparity correction unit that corrects the disparity by component in the disparity map according to the correction feature set for each of the components, and a component synthesizing unit that synthesizes the disparity map which has been corrected for each of the components and generates the corrected disparity map. This yields the effects of performing disparity correction appropriate to the respective components for each component. Also, in this case, the component set with the correction feature setting unit may be the components according to the disparity frequency in the disparity map.

Also, according to the first aspect herein, the correction features set with the correction feature setting unit may be non-linear features wherein the slope is 1 where the disparity in the disparity map nears zero, and converges into a predetermined value as the disparity in the disparity map increases. This yields the effects of avoiding distortion of the image in depth near the display plane. Also, in this case, the correction feature set with the correction features setting unit may be defined based on a sigmoid function.

Also, according to the first aspect herein, the image synthesizing unit may include a center monocular image synthesizing unit that synthesizes a center monocular image from the left image and right image of the input image based on disparity of the disparity map; a disparity/depth conversion unit that converts from disparity in the corrected disparity map into depth and generates a corrected depth map; a three-dimensional mapping unit that generates a corrected three-dimensional map by mapping the center monocular image in a three-dimensional space based on the corrected depth map; and a stereoscopic image synthesizing unit that synthesizes the right image and left image of the output image by projecting the corrected three-dimensional map on a display plane. This yields the effects of synthesizing a center monocular image from the left image and right image of the input image, and correcting the disparity based thereupon.

Also, according to the first aspect herein, the image synthesizing unit may have a direct three-dimensional mapping unit that generates a three-dimensional map by mapping the left image and right image of the input image in a three-dimensional space based on the disparity in the disparity map; a center monocular image synthesizing unit that synthesizes the center monocular image by projecting the three-dimensional map on a display plane facing a virtual center eye; a disparity/depth converting unit that converts from the disparity in the corrected disparity map into depth and generates a corrected depth map; a three-dimensional mapping unit that generates a corrected three-dimensional map by mapping the center monocular image in a three-dimensional space based on the corrected depth map; and a stereoscopic image synthesizing unit that synthesizes the right image and left image of the output image by projecting the corrected three-dimensional map onto a display plane. This yields the effects of generating a three-dimensional map from the left image and right image of the input image, and correcting the disparity based thereupon.

Also, according to the first aspect herein, a disparity analyzing unit may be further provided which analyzes the disparity in the disparity map and generates a cumulative frequency distribution of the disparity; wherein the disparity correction unit corrects the disparity in the disparity map based on the cumulative frequency distribution and the correction features. This yields the effects of smoothing a disparity histogram and actively changing the depth perception of the stereoscopic image.

Also, a second aspect of the present invention is a stereoscopic image display system having an input image supplying unit that supplies an input image having a left image and right image as a pair of stereoscopic images; a disparity detecting unit that detects disparity from a left image and right image of the input image, and generates a disparity map that holds the disparity for each pixel or pixel group; a correction feature setting unit that sets correction features in the event of correcting the disparity in the disparity map; a disparity correction unit that corrects the disparity in the disparity map according to the set correction features and generates a corrected disparity map; an image synthesizing unit that synthesizes a left image and right image of an output image from the left image and right image of the input image according to the corrected disparity map; and an image display device that displays the output image. This yields the effects of synthesizing the left image and right image based on the corrected disparity map that has been subjected to disparity correction according to set correction features, and displaying.

Advantageous Effects of Invention

According to the present invention, excellent advantages, in that disparity of a stereoscopic image can be converted, can be obtained according to features of the configuration elements of an image that influences depth perception of a stereoscopic image.

BRIEF DESCRIPTION OF DRAWINGS

FIG. 4 is a diagram illustrating a premise of a correction feature setting with a correction feature setting unit 130 according to the first embodiment of the present invention.

FIG. 10 is an example of multiple region settings by a region setting unit 140 according to the second embodiment of the present invention.

FIG. 16 is a diagram illustrating a processing overview of a 3D mapping unit 264 and stereoscopic image synthesizing unit 265 according to the third embodiment of the present invention.

FIG. 25 is a diagram illustrating an example of a disparity analysis by a disparity analyzing unit 120 according to the fifth embodiment of the present invention.

DESCRIPTION OF EMBODIMENTS

Embodiments of the present invention (hereafter called embodiments) will be described below. Description will be given in the following order.
1. First Embodiment (Example of performing disparity conversion by the size of disparity)
2. Second Embodiment (Example of performing disparity conversion with correcting features that differ by region)
3. Third Embodiment (Example of using a center monocular image)
4. Fourth Embodiment (Example of performing direct three-dimensional mapping)
5. Fifth Embodiment (Example of performing histogram smoothing of disparities)
6. Sixth Embodiment (Example of performing disparity conversion by correcting feature that differ by component)

First Embodiment

Stereoscopic Image Display System

Figure 1:
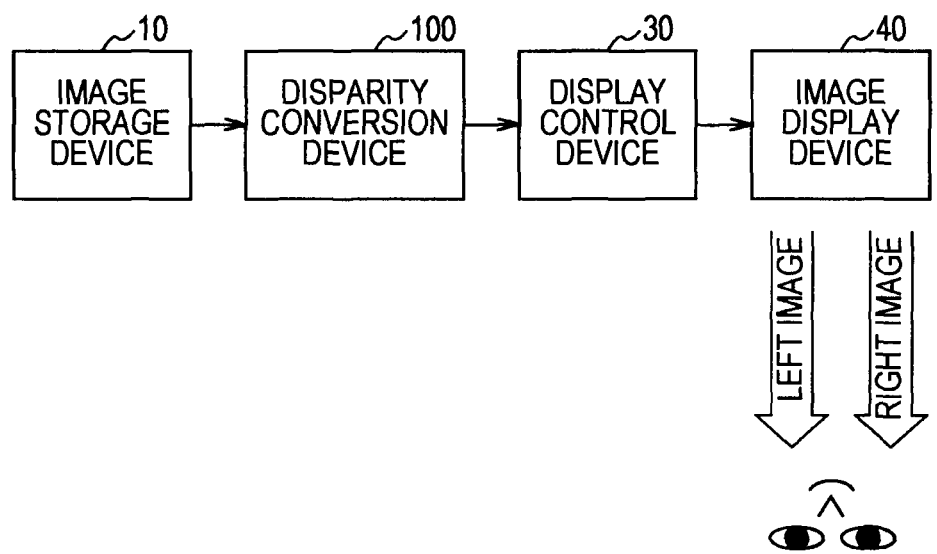
FIG. 1 is a diagram illustrating a configuration example of a stereoscopic image display system according to an embodiment of the present invention.

FIG. 1 is a diagram showing a configuration example of a stereoscopic image display system according to an embodiment of the present invention. The stereoscopic image display system herein has an image storage device 10, disparity conversion device 100, display control device 30, and image display device 40.

The image storage device 10 stores image data for stereoscopic display. Now, the image data may be a stereoscopic image having a pair of a left image perceived by a human left eye and a right image perceived by a human right eye, and may be a still image made up of a pair of left and right images, or may be a moving image wherein the left and right images (frames) are arrayed in a time-series manner. Note that the image storage device 10 is an example of the input image supply unit described in the Claims.

The disparity conversion device 100 converts the disparity of the stereoscopic image of the image data stored in the image storage device 10. That is to say, the input and output of the disparity conversion device 100 are both stereoscopic images, and are converted so that the disparity comprehended by both eyes differ.

The display control device 30 performs control so that the image data output from the disparity conversion device 100 is displayed on the image display device 40. The image display device 40 is a stereoscopic display that displays the image data as a stereoscopic image. Optional methods may be applied as a stereoscopic display method, such as a method to alternately dispose left and right images on every other scanning line, or a method to display left and right images in a time-division manner. The display control device 30 performs display control so as to correspond to the display method of the image display device 40 herein.

[Disparity Conversion Device]

Figure 2:
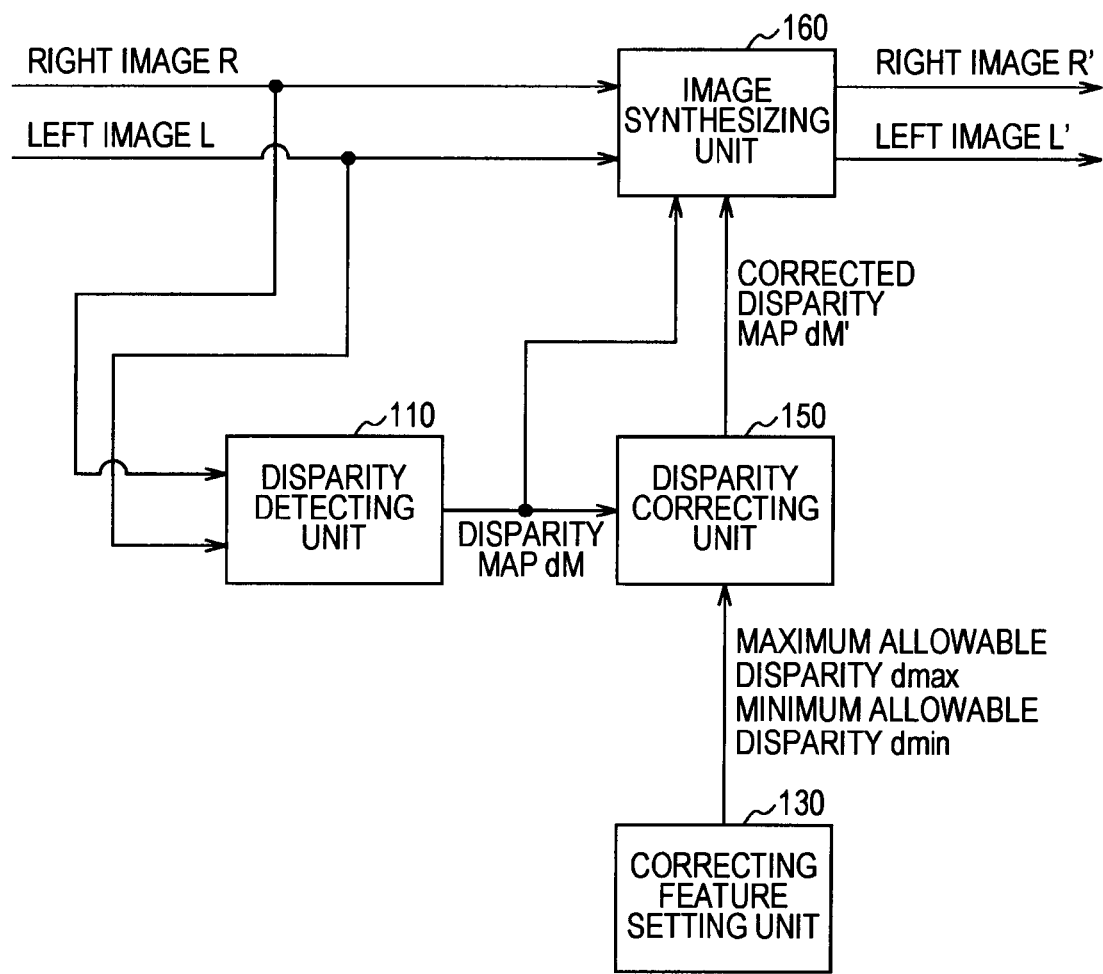
FIG. 2 is a diagram illustrating a configuration example of a disparity conversion device 100 according to a first embodiment of the present invention.

FIG. 2 is a diagram illustrating a configuration example of the disparity conversion device 100 according to the first embodiment of the present invention. The disparity conversion device 100 according to the first embodiment receives a stereoscopic image made up of the left image L and right image R as an input image, converts the disparity thereof, and outputs a stereoscopic image made up of a left image L' and right image R' as an output image. The disparity conversion device 100 has a disparity detecting unit 110, correcting feature setting unit 130, disparity correction unit 150, and image synthesizing unit 160.

The disparity detecting unit 110 detects disparity from the left image L and right image R of the input image, and generates a disparity map dM. the disparity map dM herein holds the disparity for every pixel or pixel group of the input image. In this case, either the left image L or the right image R may be used as a standard for the input image. Also, disparity of both the left image L and the right image R may be obtained for processing of hidden portions. Estimating methods of disparity are known techniques, and a technique is known whereby disparity of left and right images are estimated and disparity map is generated by performing matching of a frontground image having removed the background images from the left and right images (e.g., Japanese Unexamined Patent Application Publication No. 2006-114023).

The disparity correction unit 150 corrects the disparity in the disparity map dM and generates a corrected disparity map dM'. The correction feature setting unit 130 sets the correction features in the event of performing disparity correction with the disparity correction unit 150. In the case that disparity correction is performed with a sigmoid function with the disparity correction unit 150, a maximum allowable disparity dmax and minimum allowable disparity dmin are set are correction features. Details of the disparity correction will be described later.

The image synthesizing unit 160 synthesizes a left image L and right image R of the stereoscopic image based on the corrected disparity map dM', and outputs the stereoscopic image made up of the left image L' and right image R' as an output image.

[Disparity Correction]

Figure 3:
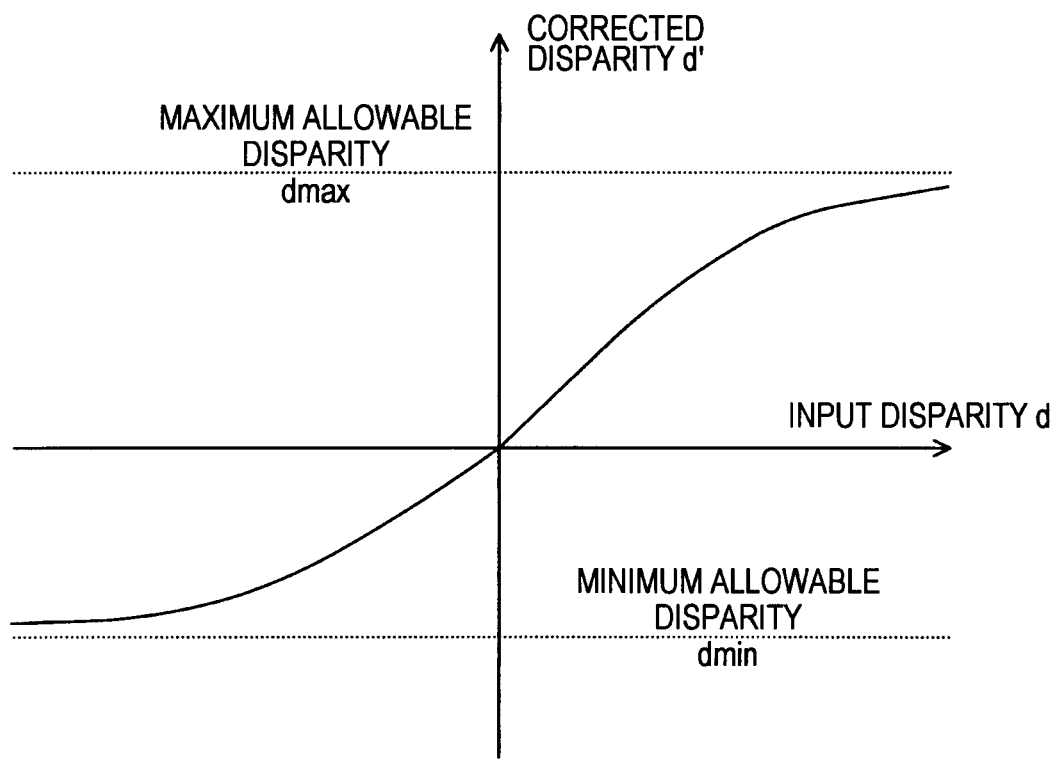
FIG. 3 is a diagram illustrating an example of disparity correction with a disparity correction unit 150 according to the first embodiment of the present invention.

FIG. 3 is a diagram showing an example of disparity correction with the disparity correction unit 150 according to the first embodiment of the present invention. In the diagram herein, the horizontal axis indicates an input disparity d, and the vertical axis indicates a corrected disparity d' after correction. In the case that disparity is increased in the positive direction, a sense of pulling backwards is obtained, and in the case that disparity is decreased in the negative direction, and sense of popping out forward is obtained.

The graphed shown with a solid line indicates the relation between the input disparity d and corrected disparity d'. The graph herein has the form of a sigmoid function as an example of a non-linear function, and the more the input disparity d increases in the positive direction, the more the corrected disparity d' nears the maximum allowable disparity dmax, and the more the input disparity d decreases in the negative direction, the more the corrected disparity d' nears the minimum allowable disparity dmin. That is to say, the correction feature herein is a non-linear feature which converges to a predetermined value as the disparity in the disparity map increases. The maximum allowable disparity dmax and the minimum allowable disparity dmin are determined by the viewing functions of the viewer (observer) of display size (size of display plane) and viewing distance, and according to the embodiment of the present invention are set by the correcting feature setting unit 130.

In this graph, in the vicinity that the input disparity becomes zero, the slope is caused to be "1", whereby image distortion of the depth near the display plane can be avoided. However, in the case that the depth amount is insufficient overall, increasing the slope of the graph more than "1" may be considered in order to show a stereoscopic movie having an accentuated depth perception.

The sigmoid function assumed here can be obtained with the following expression.

$$\zeta(x)=1/(1+e-x)$$

Also, a function such as the following may be used, wherein a constant value 0.5 is subtracted from the function in the above expression and a scaling factor d is multiplied overall.

$$\zeta(x)=d \times (1/(1+e-x)-0.5)$$

FIG. 4 is a diagram showing a premise for the correction feature settings by the correction feature setting unit 130 according to the first embodiment of the present invention. In the case of performing disparity correction based on sigmoid function with the disparity correction unit 150, the maximum allowable disparity dmax and minimum allowable disparity dmin have to be set as correction features with the correction features setting unit 130. These maximum allowable disparity dmax and minimum allowable disparity dmin are set by general perception features. Hereafter, it is assumed that a nearest allowable position Dmin and farthest allowable position Dmax are first obtained, and the maximum allowable disparity dmax and minimum allowable disparity dmin are obtained base on these.

In FIG. 4(*a*), an angle whereby the display plane which is at a position of visual distance DD from both eyes is viewed orthogonally is set as α, and an angle whereby a flat face in the nearest allowable position Dmin is viewed orthogonally is set as β. If the distance between the right eye and left eye is a spacing between both eyes e, the angle α can be obtained with the following expression.

$$\tan(\alpha/2)=(1/DD) \times (e/2)$$

$$\alpha=2\tan-1(e/(2 \cdot DD))$$

Similarly, the angle β can be shown with the following expression.

$$\beta=2\tan-1(e/(2 \cdot D\min))$$

Now, with general perception features, $$\beta-\alpha \le 60'$$

holds, whereby the nearest allowable position Dmin is shown by the following expression.

$$D\min \le e/2 \tan((60+\alpha)/2)$$

If the line of vision is moved further away from the state wherein the line of vision of both eyes is parallel as in FIG. 4(*b*), there is the fear of having an uncomfortable feeling. In the state where the line of vision of both eyes is parallel, the farthest allowable position Dmax is in an infinitely large position. The disparity with the display plane at this time becomes equal to the spacing between both eyes. The spacing between both eyes is said to be approximately 65 mm. Accordingly, the maximum allowable disparity dmax can be set as approximately 65 mm.

Figure 5:
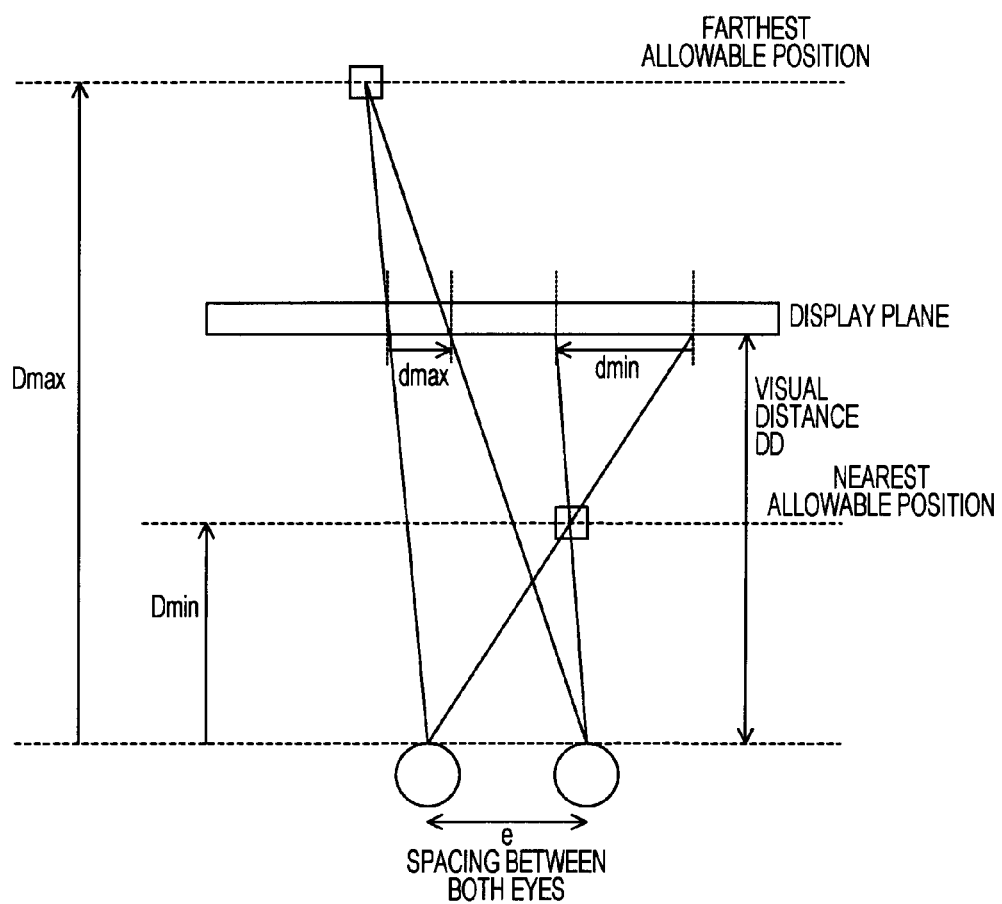
FIG. 5 is a diagram illustrating an example of a correction feature setting with the correction feature setting unit 130 according to the first embodiment of the present invention.

FIG. 5 is a diagram showing an example of a correction feature setting by the correction feature setting unit 130 according to the first embodiment of the present invention. The disparity with a display plane at visual distance DD in the event of viewing a flat face at a nearest allowable position Dmin from both eyes becomes the minimum allowable disparity dmin. Also, the disparity with a display plane at visual distance DD in the event of viewing a flat face at a farthest allowable position Dmax from both eyes becomes the maximum allowable disparity dmax. Here, the two are expressed as in the following expressions.

$$d\min=e(D\min-DD)/D\min$$

$$d\max=e(D\max-DD)/D\max$$

The maximum allowable disparity dmax only has to be set to approximately 65 mm as described above, but in the case that an optional position is set as the farthest allowable position Dmax, the maximum allowable disparity dmax can be obtained from the above expression.

Note that according to the above expression, the disparity value is obtained using length as a unit, but number of pixels can be the unit by dividing the disparity value by the pixel spacing of the display plane. For example, if we say that the screen width of the display plane is W[mm] and the number of pixels in the horizontal direction is N[pixels], the pixel spacing is W/N [mm/pixels]. Accordingly, in order to convert the length unit disparity d[mm] into pixel unit disparity d"[pixels], the following expression can be used.

$$d''=d/(W/N)$$

Note that the settings of the correction feature based on general perception feature has been described here, but the correction features can be set appropriately according to the preferences of the viewer. In this case, required parameters are input by a user, and the correction feature setting unit 130 receives this to set the correction feature.

Figure 6:
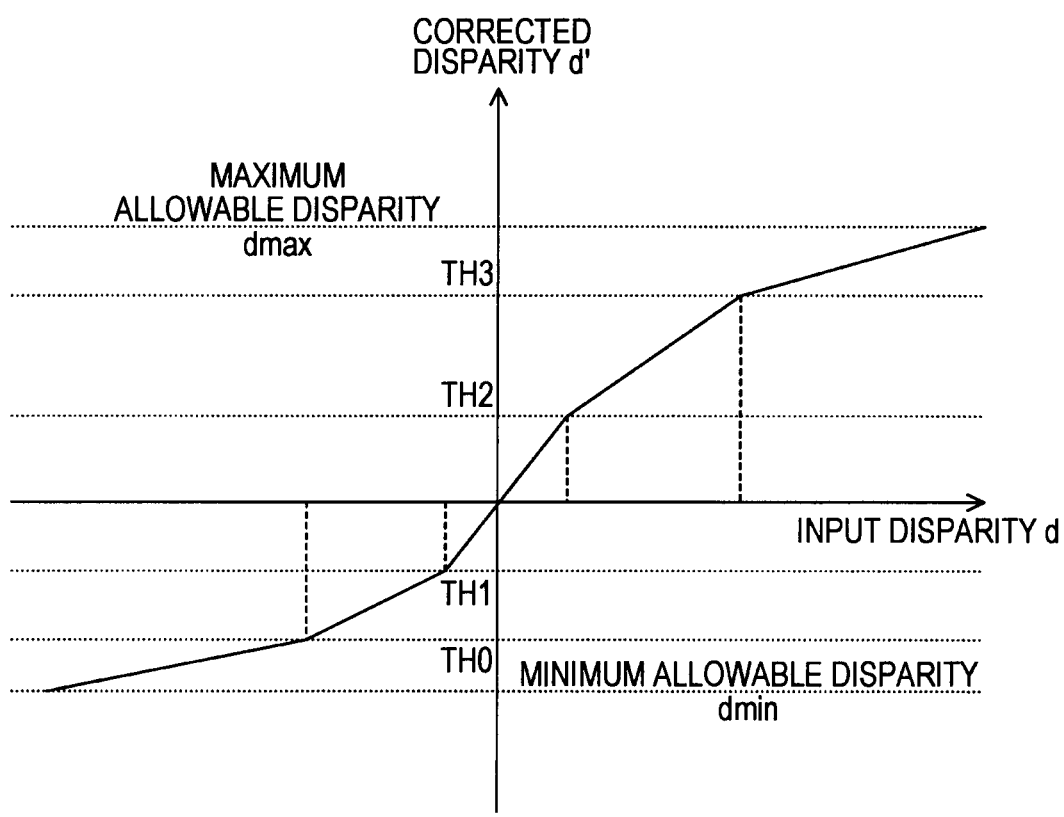
FIG. 6 is a diagram illustrating another example of disparity correction with the disparity correction unit 150 according to the first embodiment of the present invention.

FIG. 6 is a diagram showing another example of disparity correction with the disparity correction unit 150 according to the first embodiment of the present invention. The points wherein the horizontal axis is the input disparity d and the vertical axis is the correction disparity after correction d' are the same as in FIG. 3.

In this graph, the correction feature is set so that the region narrowed down to the maximum allowable disparity dmax and minimum allowable disparity dmin are divided into multiple ranges, and disparity can appropriately reappear within each range. In this case, the coordinates of intersections that link the various ranges need to be set with the correction feature setting unit 130.

Now, as correcting features set by the correction feature setting unit 130, an example of a sigmoid function as in FIG. 3 and an example of a line graph as in FIG. 6 are given, but a correction feature having another non-linear correlation can be set. For example, setting with an arctan (arc tangent) function can be considered.

[Image Synthesizing]

Figure 7:
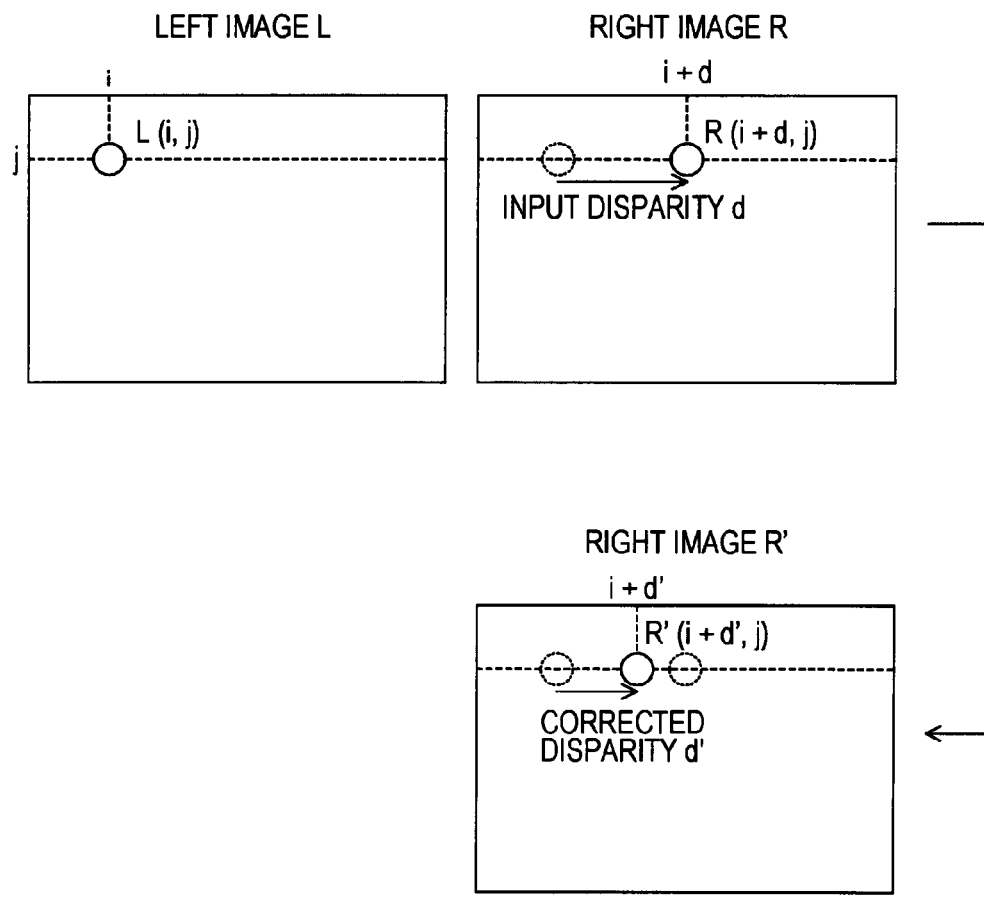
FIG. 7 is a diagram illustrating an example of image synthesizing by an image synthesizing unit 160 according to the first embodiment of the present invention.

FIG. 7 is a diagram showing an example of image synthesizing with an image synthesizing unit 160 according to the first embodiment of the present invention. Let us say that the pixel at coordinate (i, j) of the left image L of the input image is L(i, j). At this time, in the right image R of the input image the position is shifted in the horizontal direction in the amount of the input disparity d, whereby the pixel corresponding to L(i, j) becomes R(i+d, j).

On the other hand, in the right image R' of the output image, the position is shifted in the horizontal direction by the corrected disparity d', whereby the pixel corresponding to L(i, j) becomes R'(i+d', j). Also, since the left image is being used as the standard, the left image L of the input image and the left image L' of the output image match. Accordingly, the left image L' and right image R' of the output image synthesized by the image synthesizing unit 160 are obtained with the following expression.

$$L'(i,j)=L(i,j)$$

$$R'(i+d',j)=(d'\cdot L(i,j)+|d-d'|\cdot R(i+d,j))/(|d-d'|+d')$$

Note that in this example the right image is synthesized using the left image as a standard, but conversely, the left image may be synthesized using the right image as a standard.

[Operation]

Figure 8:
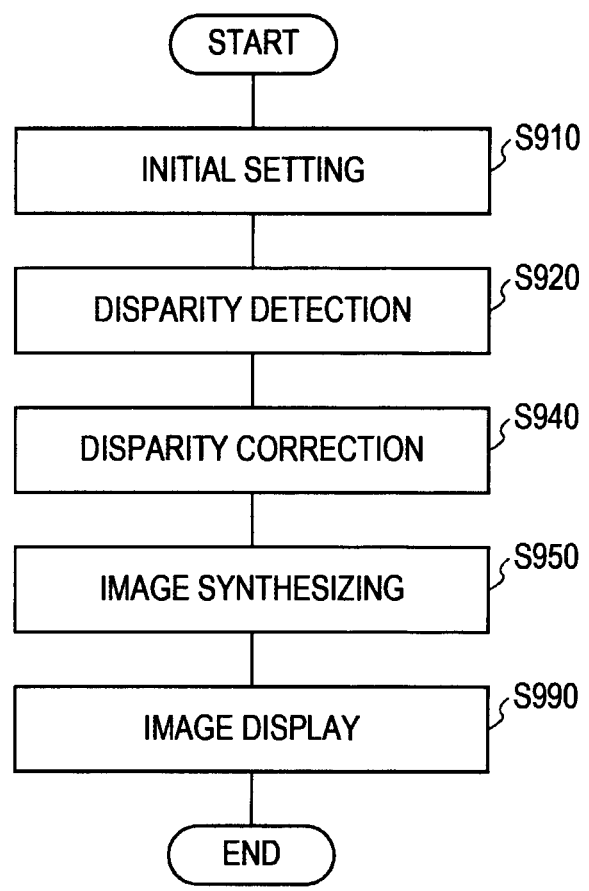
FIG. 8 is a diagram illustrating an operation example of the disparity conversion device 100 according to the first embodiment of the present invention.

FIG. 8 is a diagram showing an operation example of the disparity conversion device 100 according to the first embodiment of the present invention. First, correction features of disparity correction as initial settings are set with the correction feature setting unit 130 (step S910). Then disparity is detected with the disparity detecting unit 110 from the left image L and right image R of the input image, and a disparity map dM is generated (step s920). With the correction features thus set, the disparity in the disparity map dM is corrected with the disparity correction unit 150, and a corrected disparity map dM' is generated (step S940).

Based on the disparity in the corrected disparity map dM' thus generated, an output image is synthesized from the input image with the image synthesizing unit 160 (step S950). The synthesized output image herein is displayed on the image display device 40 via the display control device 30 (step S990).

Thus, according to the first embodiment of the present invention, the disparity correction unit 150 corrects the disparity of the input image according to correction features set by the correction feature setting unit 130, and the image synthesizing unit 160 synthesizes the output image with the corrected disparity. Thus, excessive depth perception can be suppressed, and presenting a stereoscopic movie that is enjoyable to the viewer can be performed.

Second Embodiment

Disparity Conversion Device

Figure 9:
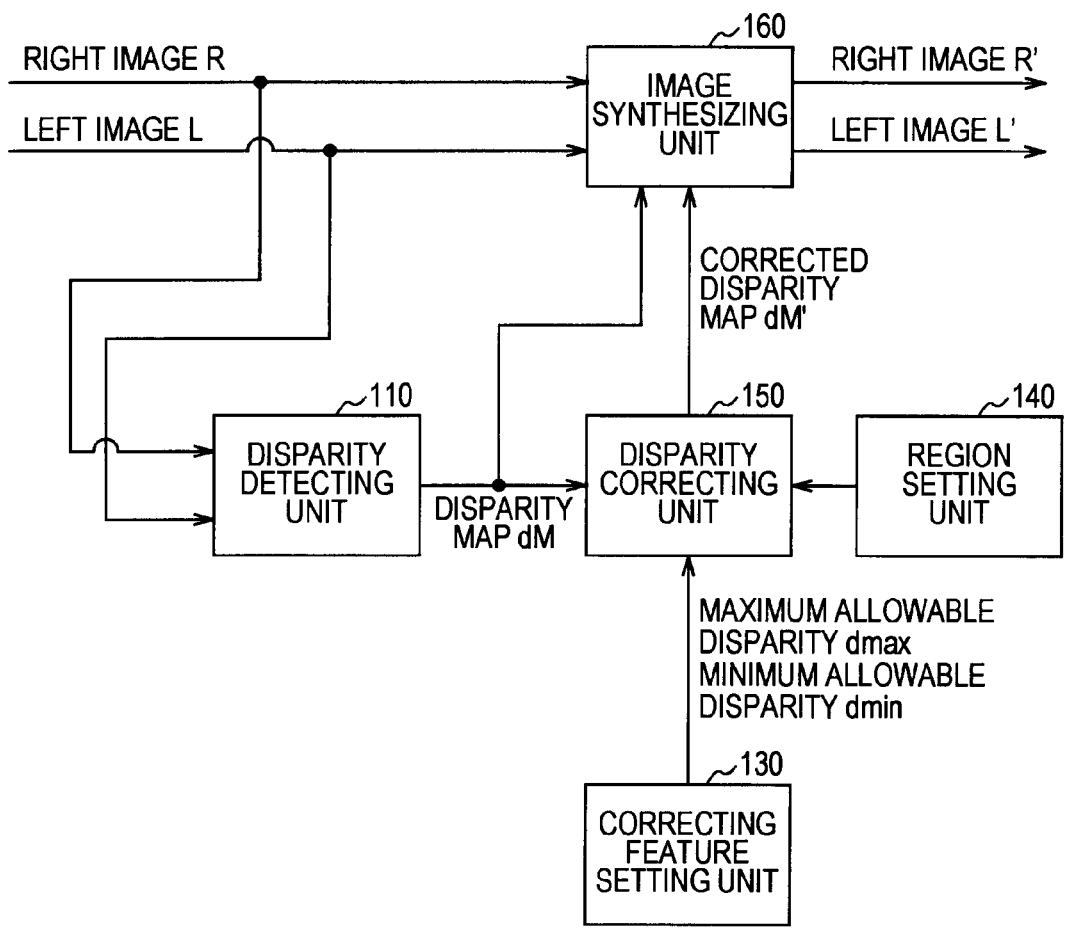
FIG. 9 is a diagram illustrating an operation configuration example of the disparity conversion device 100 according to a second embodiment of the present invention.

FIG. 9 is a diagram showing a configuration example of a disparity conversion device 100 according to a second embodiment of the present invention. The disparity conversion device 100 according to the second embodiment of the present invention differs in the point of further having a region setting unit 140, as compared to the first embodiment.

The region setting unit 140 sets multiple regions in the disparity map dM. FIG. 10 is an example of multiple region settings by the region setting unit 140 according to the second embodiment of the present invention. For example, a second region corresponding to the left and right edges is set as to a first region in the center of the disparity map dM, as shown in FIG. 10(a). By setting the first region and second region in this manner, different correction features can be set for each of the regions.

The correction feature setting unit 130 sets correction features separately for each region set by the region setting unit 140. For example, the first region in the center of the disparity map dM may be corrected based on a sigmoid function for both directions of positive and negative as shown in FIG. 10(b), and the second region corresponding to the left and right edges may be corrected so that popping out in the negative direction (forward side) is not performed, as shown in FIG. 10(c). Thus, unnatural popping out at the left and right edges can be avoided, thus resolving discomfort to the observer (shielding conflict).

Figure 11:
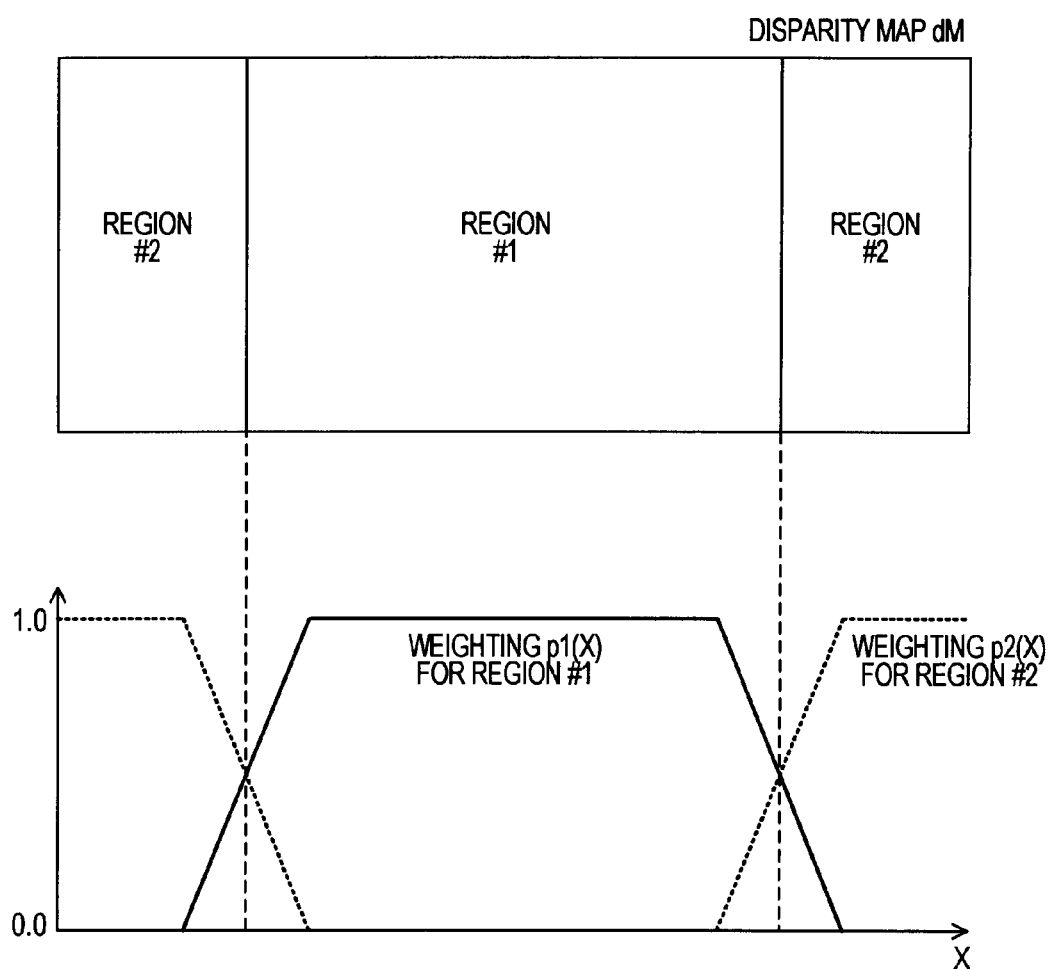
FIG. 11 is a diagram illustrating an example of weighting in the event of realizing a weighted sum of correcting features according to the second embodiment of the present invention.

In this case, to avoid discontinuity between regions, a buffer region may be provided between different regions, so that the corrected disparity is determined by the weighted sum of two correction features according to the distance from both regions that are adjacent within the buffer region. FIG. 11 is a diagram showing an example of weighting in the event of realizing the weighted sum of the correction feature according to the second embodiment of the present invention. A weighting p1(x) for the first region and a weighting p2(x) for the second region are shown in this diagram. A buffer region is provided between the first region and second region, and the buffer region is set so that decrease the weighting p1(x) or p2(x) are decreased the farther removed from the center of the original region. The relation between weighting p1(x) and p2(x) is in the following expression.

$$p1(x)+p2(x)=1$$

The weighting p1(x) or p2(x) thus set are used to obtain a final correction disparity d' as in the following expression. However, F1(d) is a correction function for the first region and F2(d) is a correction function for the second region.

$$d'=p1(x)\times F1(d)+p2(x)\times F2(d)$$

[Operation]

The operations according to the second embodiment of the present invention, of the processing procedures of the first embodiment described with FIG. 8, differ in the point that in the initial settings in step S910, the region setting unit 140 sets multiple regions, and the correction feature setting unit 130 provides correction features for each region. In points other than this, the operations are similar to the first embodiment, and accordingly detailed description will be omitted here.

Thus, according to the second embodiment of the present invention, the region setting unit 140 sets multiple regions in the disparity map dM, whereby correction features appropriate for each region can be set, and shielding conflict near the image frame can be resolved.

Third Embodiment

Disparity Conversion Device

Figure 12:
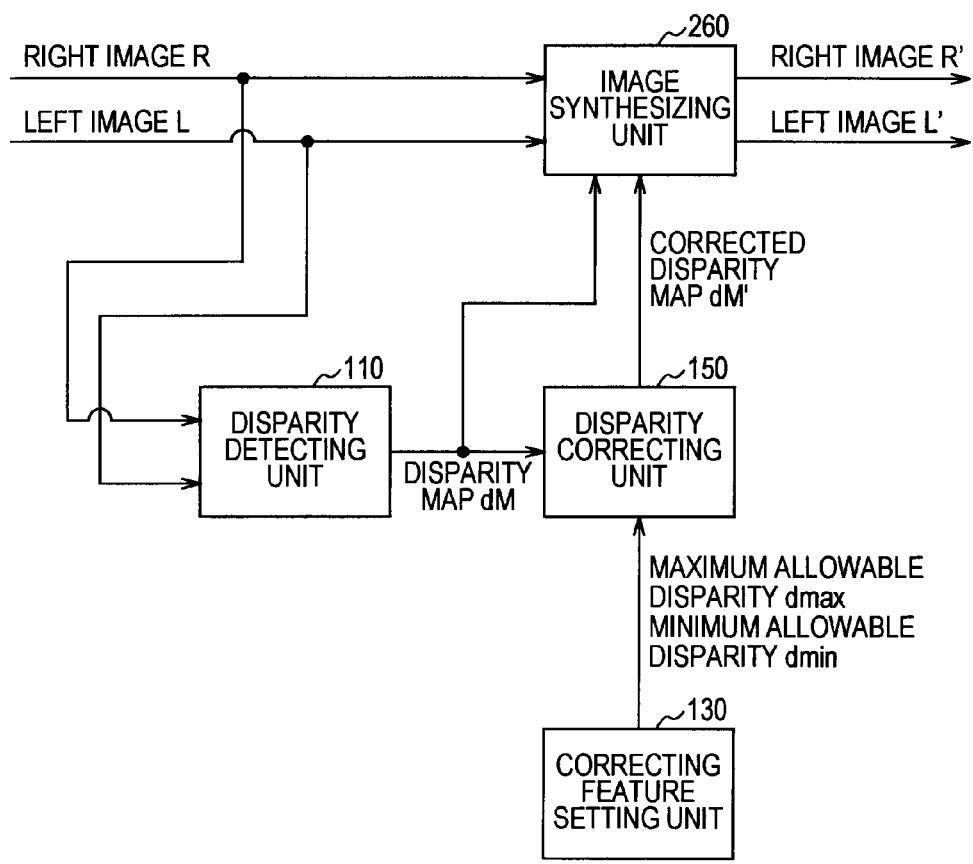
FIG. 12 is a diagram illustrating a configuration example of a disparity conversion device 100 according to a third embodiment of the present invention.

FIG. 12 is a diagram showing a configuration example of a disparity conversion device 100 according to the third embodiment of the present invention. The disparity conversion device 100 according to the third embodiment herein has different image synthesis content in the image synthesizing unit 260 as compared to the first embodiment. Content of the image synthesizing unit 260 will be described below.

[Image Synthesizing]

Figure 13:
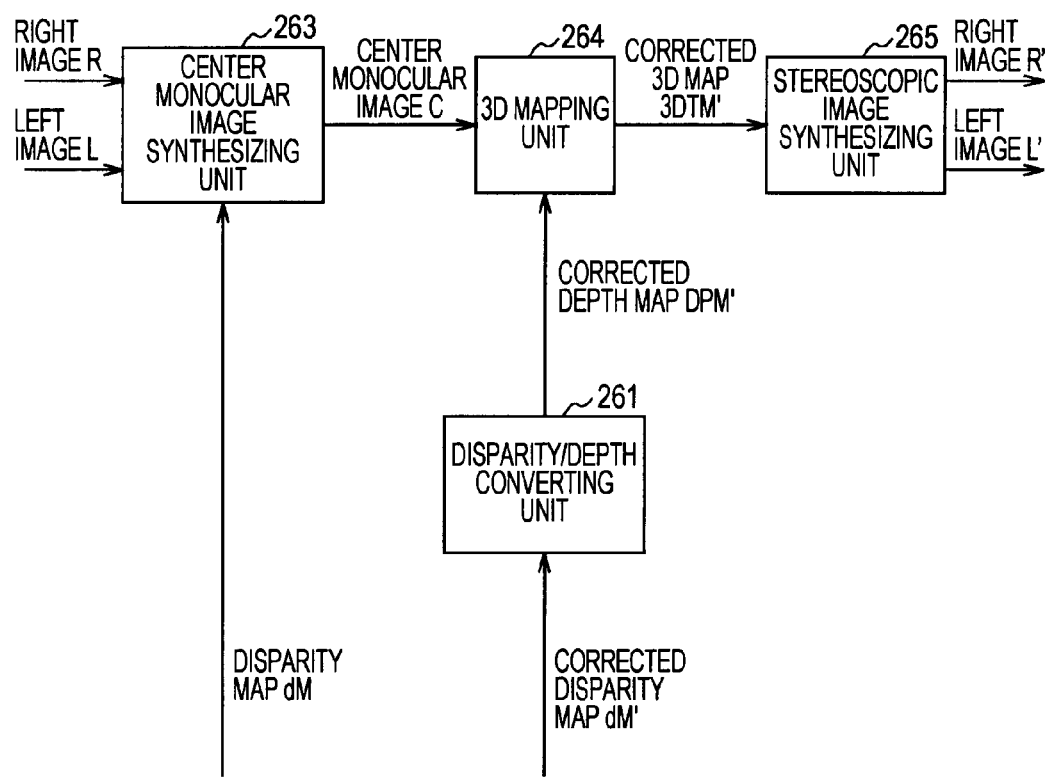
FIG. 13 is a diagram illustrating a configuration example of an image synthesizing unit 260 according to the third embodiment of the present invention.

FIG. 13 is a diagram showing a configuration example of the image synthesizing unit 260 according to the third embodiment of the present invention. The image synthesizing unit 260 has a disparity/depth conversion unit 261, center monocular image synthesizing unit 263, 3D mapping unit 264, and stereoscopic image synthesizing unit 265.

The disparity/depth conversion unit 261 converts the disparity included in the corrected disparity map dM' into distance in the depth direction, and generates a corrected depth map DPM'. The center monocular image synthesizing unit 263 synthesizes a center monocular image C from the left image L and right image R of the input image and the disparity map dM. Now, the center monocular image C is an image viewed from a center monocle that is virtually disposed between the left eye and the right eye. The center monocular image C is assumed to be disposed on a display plane that is at visual distance DD. The 3D mapping unit 264 maps the center monocular image C to a corrected 3D map 3DTM' which is a three-dimensional space depth curve according to the corrected depth map DPM'. The stereoscopic image synthesizing unit 265 projects the image mapped to the corrected 3D map DTM' onto the display plane, and synthesizes a stereoscopic image made up of a left image L' and right image R'. Note that the 3D mapping unit 264 is an example of a three-dimensional mapping unit in the Claims.

[Disparity/Depth Conversion]

Figure 14:
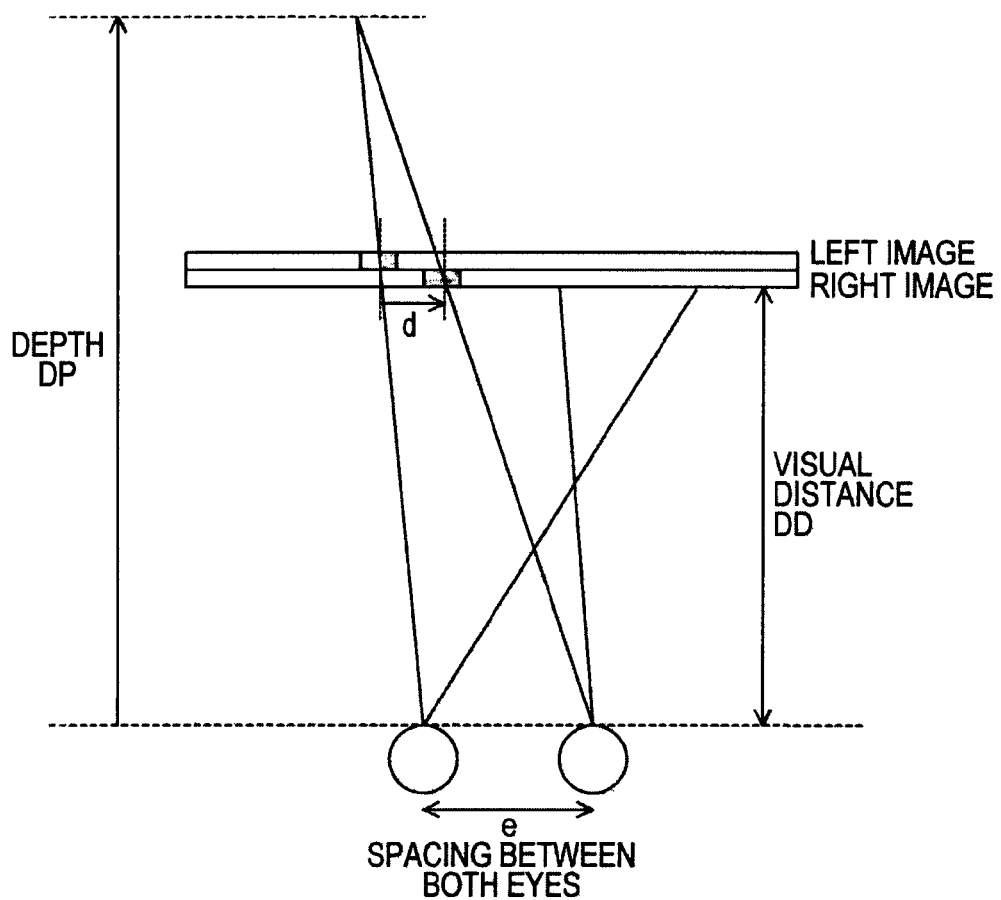
FIG. 14 is a diagram illustrating a processing example of a disparity/depth converting unit 261 according to the third embodiment of the present invention.

FIG. 14 is a diagram showing a processing example of the disparity/depth conversion unit 261 according to the third embodiment of the present invention. As in the same diagram, when the distance between both eyes is spacing between both eyes e, and the distance to the display plane is visual distance DD, the depth DP can be obtained by the following expression from the disparity d at the display plane.

$$DP = e \cdot DD/(e-d)$$

The disparity/depth conversion unit 261 inserts the disparity included in the corrected disparity map dM' into the disparity d of the above expression and finds the depth DP. The obtained depth DP is supplied to the 3D mapping unit 264 as a corrected depth map DPM' that hold the depth corresponding to each pixel, or for each pixel group, of the image. Note that the coordinates in the horizontal direction of the depth DP obtained by the above expression are unevenly distributed, whereby the depth at positions corresponding to the various pixels on the image may be obtained using interpolation or the like, and saved as a two-dimensional array.

[Center Monocular Image Synthesis]

Figure 15:
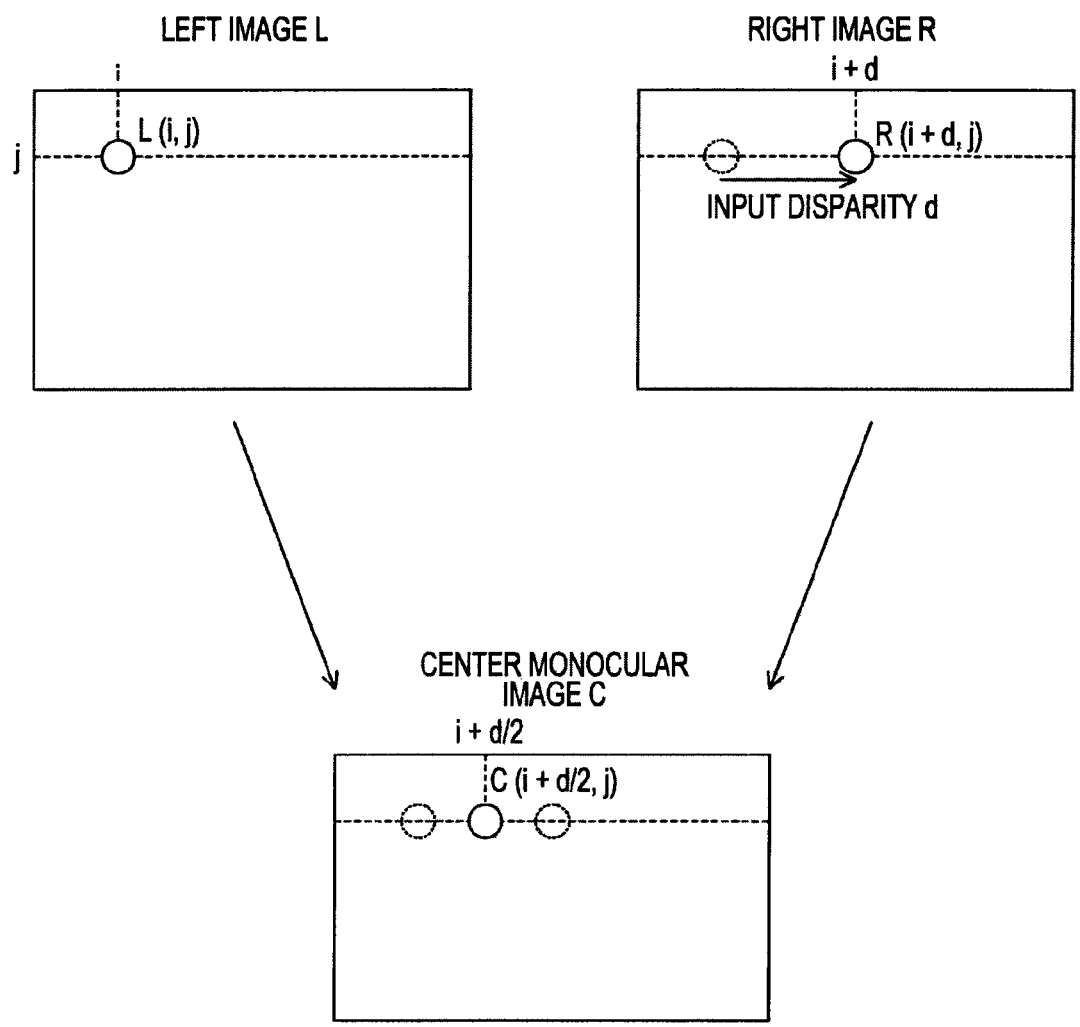
FIG. 15 is a diagram illustrating a processing example of a center monocular image synthesizing unit 263 according to the third embodiment of the present invention.

FIG. 15 is a diagram showing a processing example of the center monocular image synthesizing unit 263 according to the third embodiment of the present invention. If the left image L(i, j) at position (i, j) is a standard, the right image R of the input disparity d becomes R(i+d, j). Now, as in the same diagram, the center monocular image C is set as the intermediate position C(i+d/2, j) between the left image and right image. That is to say, the center monocular image C is expressed with the following expression.

$$C(i+d/2,j) = (L(i,j)+R(i+d,j))/2$$

Thus, the center monocular image synthesizing unit 263 synthesizes a center monocular image C that has the intermediate position between the left image L and right image R in the horizontal direction, and is in the same position as the left image L and right image R in the vertical direction. The synthesized center monocular image C herein is supplied to the 3D mapping unit 264.

[3D Mapping and Stereoscopic Image Synthesizing]

FIG. 16 is a diagram showing a processing overview of a 3D mapping unit 264 and stereoscopic image synthesizing unit 265 according to the third embodiment of the present invention. The 3D mapping unit 264 maps a depth curve wherein, in a pixel or pixel group viewing the center monocular image C from the virtual center eye estimated between the left eye and right eye, the depth shown by the corrected depth mapping DPM' is further viewed as shown in FIG. 16(*a*). This depth curve is the corrected 3D map 3DTM', and is identified in a three-dimensional space (x, y, z).

The stereoscopic image synthesizing unit 265 projects on the display plane the image in the event of viewing the corrected 3D map 3DTM' from the left eye and the right eye, as shown in FIG. 16(*b*). Thus, the left image L' and right image R' of the output image are synthesized.

Figure 17:
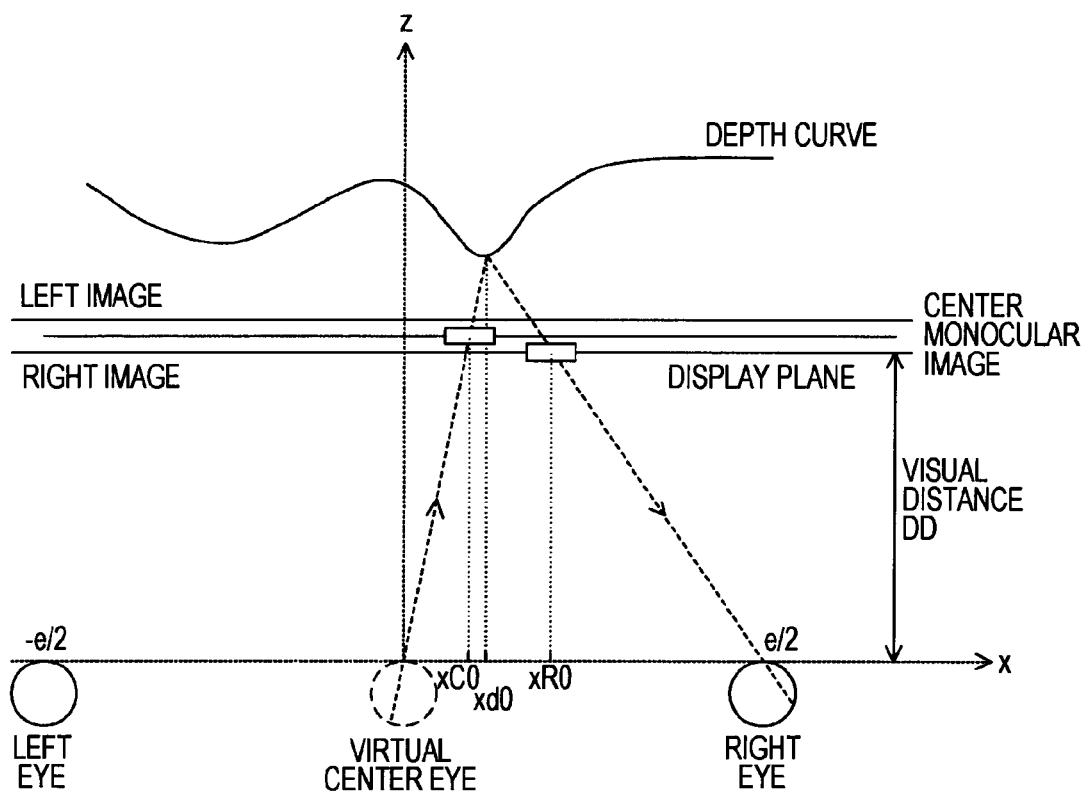
FIG. 17 is a diagram illustrating processing details of the 3D mapping unit 264 and stereoscopic image synthesizing unit 265 according to the third embodiment of the present invention.

FIG. 17 is a diagram showing processing details of the 3D mapping unit 264 and stereoscopic image synthesizing unit 265 according to the third embodiment of the present invention. In the pixel or pixel group viewing the center monocular image C at a viewing distance DD from the virtual center eye assumed between the left eye and the right eye, the depth curve at a position further viewing the depth shown by the corrected depth map DPM' is mapped by the 3D mapping unit 264. Thus, the pixel at position xC0 in the horizontal direction of the center monocular image C is mapped to the position xd0 in the horizontal direction of the corrected depth map DPM'.

The pixels thus mapped to the corrected depth map DPM' are projected in the right image at the intersection between a straight line seen from the right eye and the right image (position xR0 in the horizontal direction) by the stereoscopic image synthesizing unit 265. Similarly, the pixels are projected in the left image at the intersection between a straight line seen from the left eye and the left image.

For the right image, a straight line passing through the intersection between the right eye and an intersection on the right image (position xR0 in the horizontal direction) is shown in the following expression.

$$Z(x) = (-DD/(e/2-xR0)) \cdot x + (DD \cdot e/2)/(e/2-xR0)$$

Figure 18:
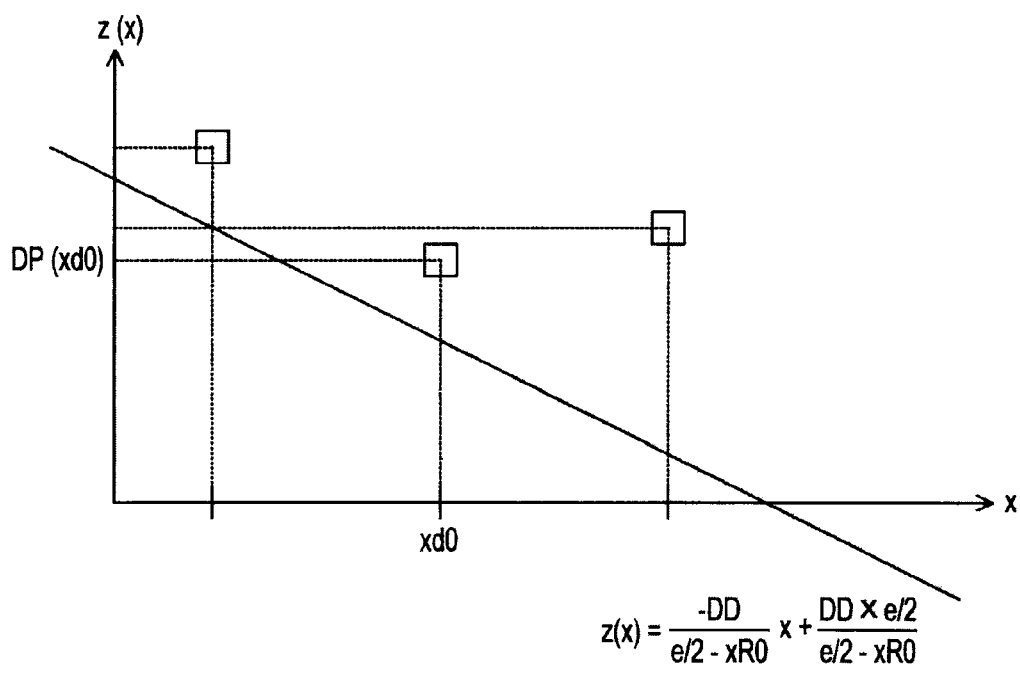
FIG. 18 is a diagram illustrating an example of image selection on a depth curve by the 3D mapping unit 264 and stereoscopic image synthesizing unit 265 according to the third embodiment of the present invention.

FIG. 18 is a diagram showing an example of image selection on a depth curve by the 3D mapping unit 264 and stereoscopic image synthesizing unit 265 according to the third embodiment of the present invention. The 3D mapping unit 264 scans the corrected depth map DPM' in the horizontal direction, and sets the horizontal pixel position as xd0 whereby the following expression becomes minimal.

$$E(x) = DPM'(x,y) - ((-DD/(e/2-xR0)) \cdot x + (DD \times e/2)/(e/2-xR0))$$

In the case that there are multiple positions whereby the above expression becomes minimal, a position nearest to xR0 may be selected.

A straight line that passes through the position of the right eye (e/2, 0) and position (xd0, DP(xd0)) is computed, and the pixel value of the intersection wherein the straight line herein intersects with the monocular center image C is set as the pixel value of position xR0 of the right image. In the case that the intersection herein is positioned between adjacent pixels, calculations are performed by interpolation from both sides.

Figure 19:
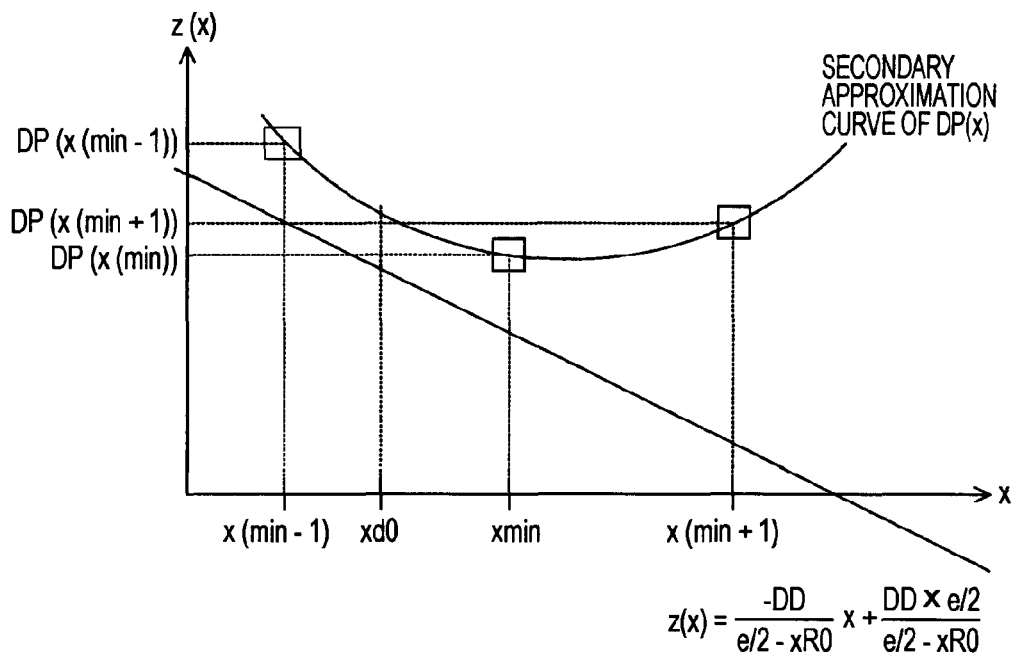
FIG. 19 is a diagram illustrating another example of image selection on a depth curve by the 3D mapping unit 264 and stereoscopic image synthesizing unit 265 according to the third embodiment of the present invention.

FIG. 19 is a diagram showing another example of image selection on a depth curve by the 3D mapping unit 264 and stereoscopic image synthesizing unit 265 according to the third embodiment of the present invention. In selecting the position xd0, from the position xmin which provides the minimum value of the above-described expression E(x) and x(min−1) and x(min+1) before and after thereof, the DP (x) between these may be approximated with a exponential curve, and the position whereby the difference in the approximation curve and straight line is the smallest and the depth amount may be obtained.

[Operation]

The operations according to the third embodiment of the present invention differ in the point that, in the image synthesizing in step S950 of the processing procedures according to the first embodiment described in FIG. 8, the disparity correction is reflected to perform synthesizing based on the center monocular image. In other points, the operations are similar to the first embodiment, so detailed description thereof will be omitted here.

Thus, according to the third embodiment of the present invention, a center monocular image according to the detected disparity is synthesized, and by reflecting the disparity correction based on the center monocular image herein, presenting a stereoscopic image that is pleasant to the viewer can be performed.

Fourth Embodiment

Disparity Conversion Device

Figure 20:
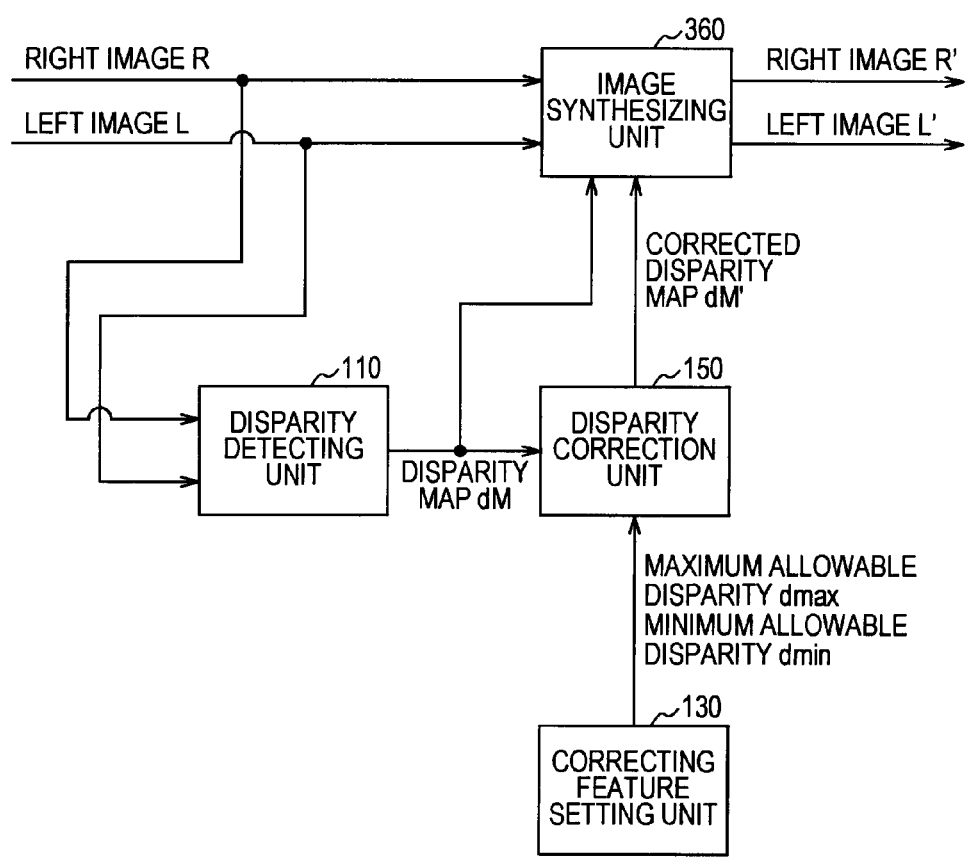
FIG. 20 is a diagram illustrating a configuration example of the disparity conversion device 100 according to a fourth embodiment of the present invention.

FIG. 20 is a diagram showing a configuration example of a disparity conversion device 100 according to a fourth embodiment of the present invention. The disparity conversion device 100 according to the fourth embodiment differs in content of the image synthesizing with the image synthesizing unit 360, as compared to the first embodiment. The content of the image synthesizing unit 360 herein will be described below.

[Image Synthesizing]

Figure 21:
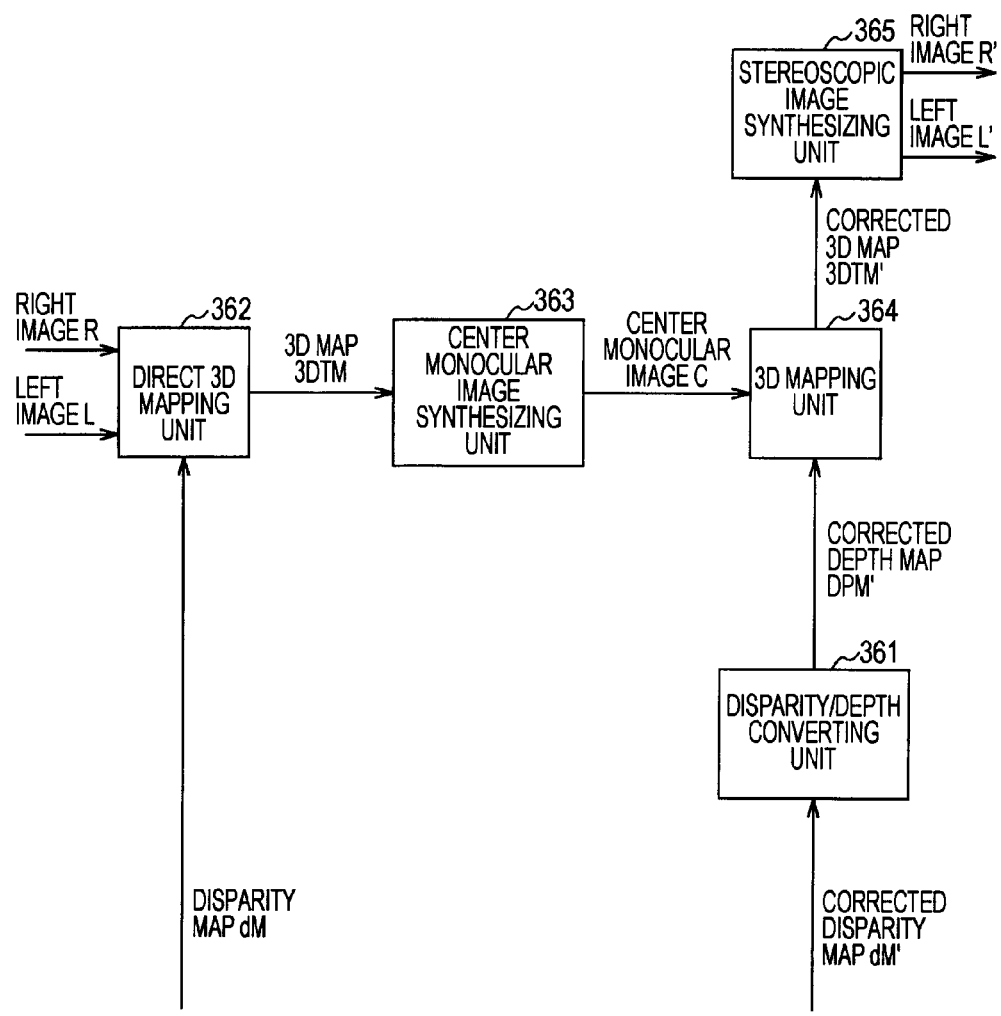
FIG. 21 is a diagram illustrating a configuration example of an image synthesizing unit 360 according to the fourth embodiment of the present invention.

FIG. 21 is a diagram showing a configuration example of the image synthesizing unit 360 according to the fourth embodiment of the present invention. The image synthesizing unit 360 has a disparity/depth conversion unit 361, direct 3D mapping unit 362, central monocular image synthesizing unit 363, 3D mapping unit 364, and stereoscopic image synthesizing unit 365. Other than the point of the image synthesizing unit 360 herein generating a 3D map with the direct 3D mapping unit 362 and the central monocular image synthesizing unit 363 synthesizing a center monocular image C from the 3D map herein, the configuration is similar to the image synthesizing unit 260 according to the third embodiment described above. The direct 3D mapping unit 362 generates a 3D map 3DTM from the disparity map dM and the left image and right image of the input image. Note that the direct 3D mapping unit 362 is an example of a direct three-dimensional mapping unit described in the Claims. Also, the 3D mapping unit 364 is an example of a three-dimensional mapping unit described in the Claims.

Figure 22:
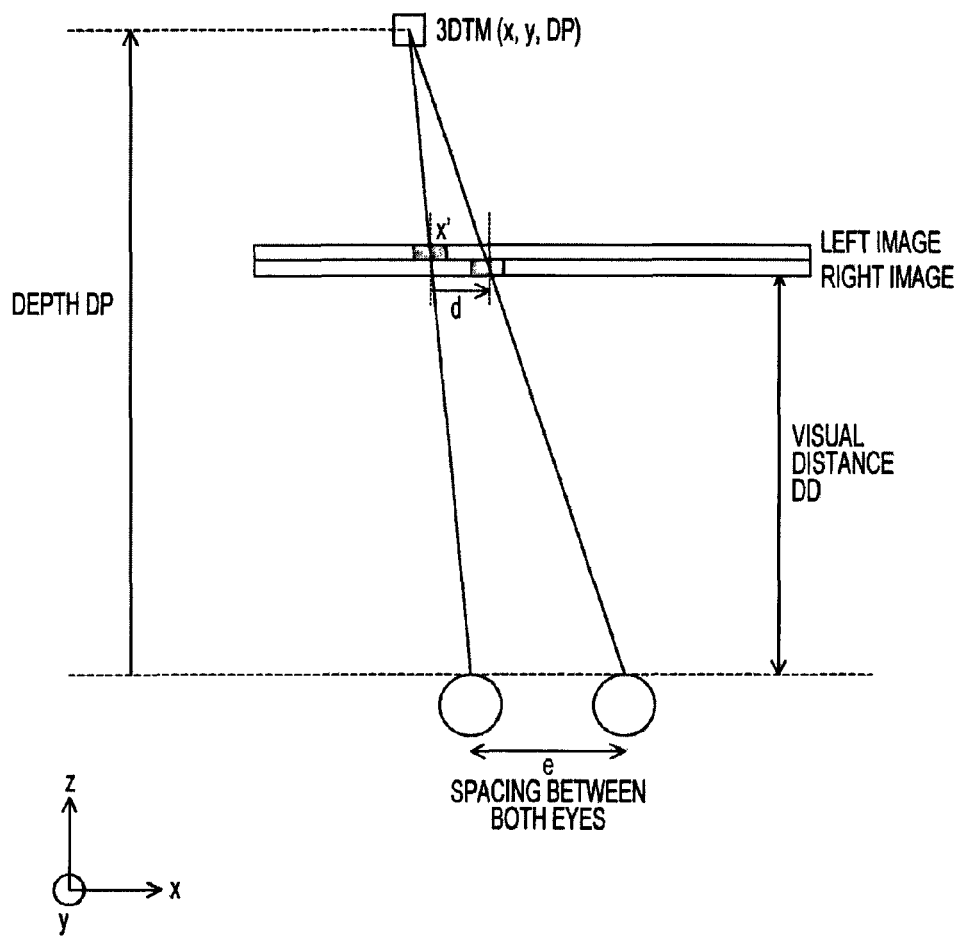
FIG. 22 is a diagram illustrating a processing example by a direct 3D mapping unit 362 according to the fourth embodiment of the present invention.

FIG. 22 is a diagram showing a processing example by the direct 3D mapping unit 362 according to the fourth embodiment of the present invention. With the left image L(x', y) as a standard, a right image R(x'+d, y) in the position that is shifted by disparity d in the horizontal direction is estimated. Let us say that the direct 3D mapping unit 362 sets an intersection of a straight line viewing the left image L(x', y) from the left eye and a straight line viewing the right image R(x'+d, y) from the right eye at point 3DTM (x, y, DP) on the 3D map. That is to say, the 3DTM (x, y, DP) can be obtained with the following expression.

$$3DTM(x,y,DP)=(L(x',y)+R(x'+d,y))/2$$

Figure 23:
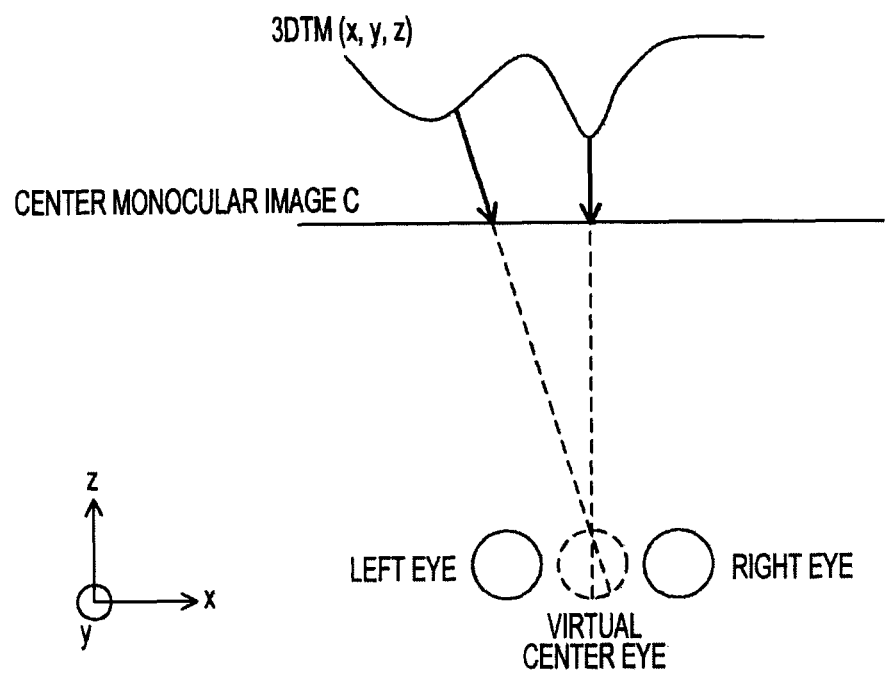
FIG. 23 is a diagram illustrating a processing example of a center monocular image synthesizing unit 363 according to the fourth embodiment of the present invention.

FIG. 23 is a diagram showing a processing example with the center monocular image synthesizing unit 363 according to the fourth embodiment of the present invention. The center monocular image synthesizing unit 363 projects from the various points on the 3D map 3DTM (x, y, z), which is a depth curve, toward the display plane, as to the virtual center eye assumed between the left eye and right eye, and synthesizes the center monocular image C. That is to say, the center monocular image synthesizing unit 363 performs operations in the reverse from the 3D mapping unit 264 described in FIG. 16(a).

[Operation]

The operations according to the fourth embodiment of the present invention differ in the point that, in the image synthesizing in step S950 of the processing procedures according to the first embodiment described in FIG. 8, the disparity correction is reflected to perform synthesizing based on the center monocular image. In other points, the operations are similar to the first embodiment, so detailed description thereof will be omitted here.

Thus, according to the fourth embodiment of the present invention, by directly synthesizing the center monocular image according to disparity from the input image and reflecting the disparity correction based on the center monocular image herein, presenting a stereoscopic image that is pleasant to the viewer can be performed.

Fifth Embodiment

Disparity Conversion Device

Figure 24:
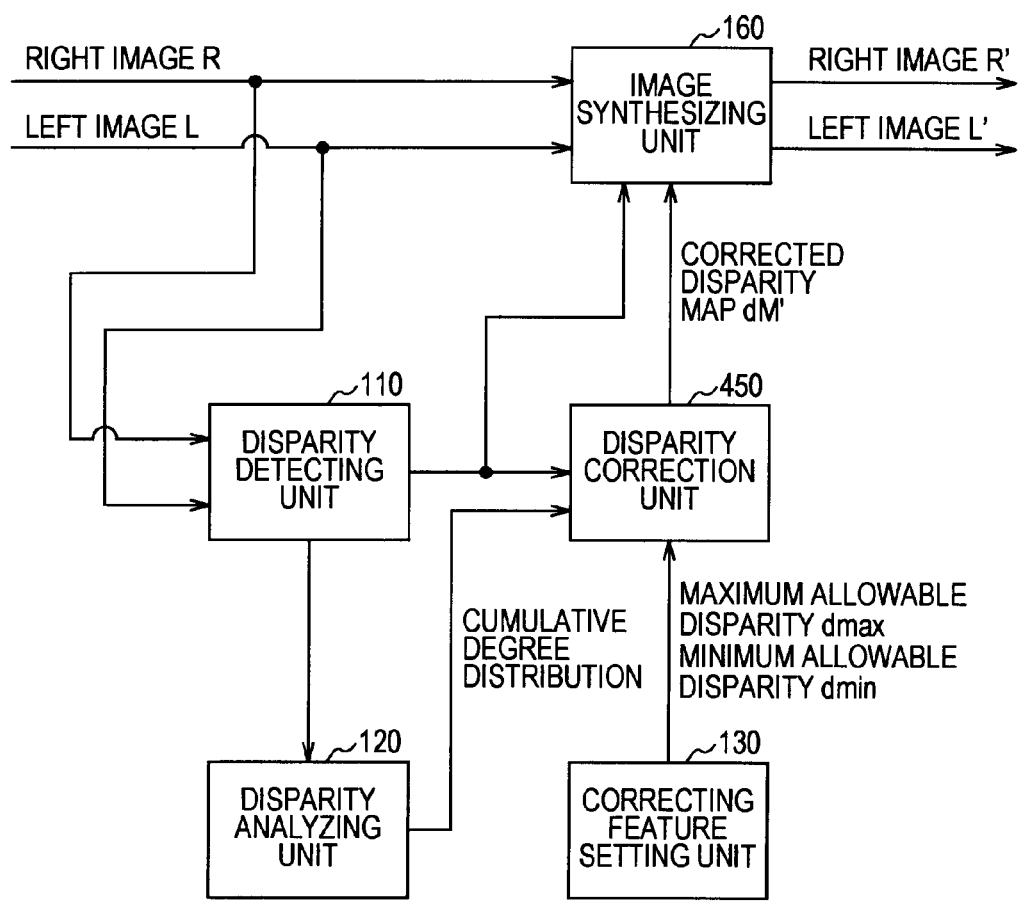
FIG. 24 is a diagram illustrating a configuration example of the disparity conversion device 100 according to a fifth embodiment of the present invention.

FIG. 24 is a diagram showing a configuration example of a disparity conversion device 100 according to a fifth embodiment of the present invention. Compared to the first embodiment, the disparity conversion device 100 according to the fifth embodiment differs in the points of further having a disparity analyzing unit 120 that generates a cumulative frequency distribution of disparity, and the disparity correction unit 450 performing disparity correction based on the cumulative frequency distribution thereof. Content of the disparity analysis by the disparity analyzing unit 120 and the disparity correction by the disparity correction unit 450 will be described below.

[Disparity Analysis and Disparity Correction]

FIG. 25 is a diagram showing an example of disparity analysis by the disparity analyzing unit 120 according to the fifth embodiment of the present invention. The disparity analyzing unit 120 generates a histogram of the disparity d within an image in the disparity map dM, as shown in FIG. 25(a). In the same diagram, the horizontal axis is disparity d, and the vertical axis indicates the frequency h(d) as to the disparity d.

The disparity analyzing unit 120 changes the input/output features of the disparity correction unit 450 so as to smooth the histogram of the disparity d, thereby maximizing the disparity histogram. Thus, smoothing is performed so that the disparity appearance frequency is all the same, and consequently the depth perception of the stereoscopic image can be actively modified.

The disparity d' after performing the smoothing is shown as a product of the disparity maximum value after smoothing dmax and the cumulative frequency distribution P(z), as in the following expression.

$$d'=d\mathrm{max}\times P(z)$$

However, the cumulative frequency distribution P(z) is normalized by the total amount of data. Therefore, P(z)<1.0 holds.

Now, the cumulative frequency distribution P(z) is expressed with the following expression.

$$P(z)=(1/N)\times\Sigma h(d)$$

However, sum total Σ uses d=0 through z as a domain. That is to say, the disparity d focuses on only a positive range here. For a negative range, a similar separate processing has to be performed.

FIG. 25(b) shows the disparity d' after smoothing thus obtained. The disparity d' after smoothing based on the cumulative frequency distribution P(z) is supplied to the disparity correction unit 450 from the disparity analyzing unit 120 for both a positive range and negative range. Note that the disparity d' after smoothing has multiplied the cumulative frequency distribution P(z) by dmax as described above, whereby in this Specification is handled as a broad cumulative frequency distribution.

The disparity correction unit 450 performs disparity correction based on the cumulative frequency distribution supplied from the disparity analyzing unit 120. That is to say, in the first embodiment, disparity correction is performed using a nonlinear function such as a sigmoid function, but in the fifth embodiment, disparity correction is performed using a cumulative frequency distribution curve. Thus, the correcting feature can be actively modified according to the disparity distribution of the image to perform disparity correction. Note that the point of adjusting the gain so as to near the maximum allowable disparity dmax and minimum allowable disparity dmin set by the correcting feature setting unit 130 is similar to the first embodiment.

[Operation]

Figure 26:
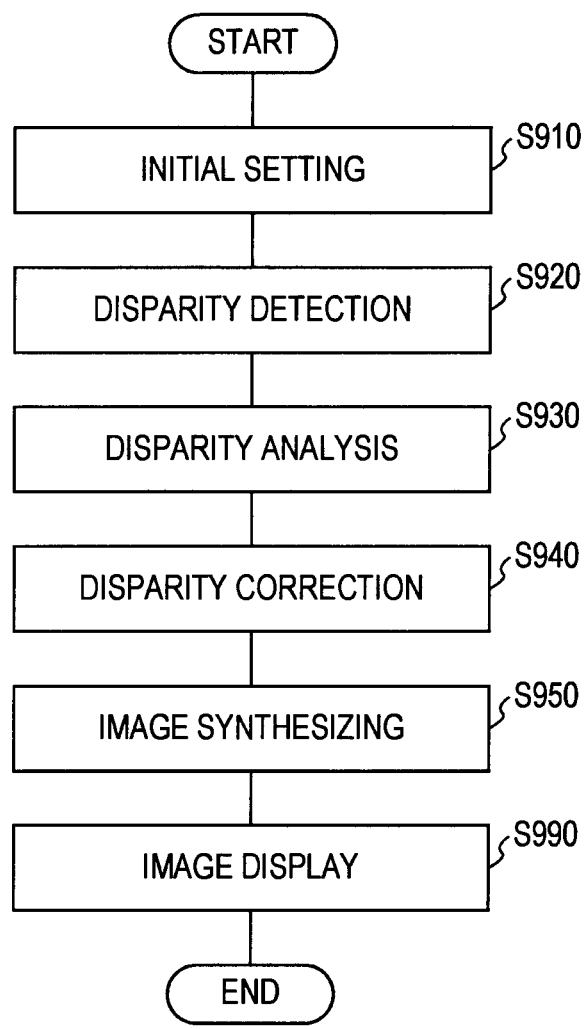
FIG. 26 is a diagram illustrating an operation example of the disparity conversion device 100 according to the fifth embodiment of the present invention.

FIG. 26 is a diagram showing an operation example of the disparity conversion device 100 according to the fifth embodiment of the present invention. First, at the correction feature setting unit 130, correction features of the disparity correction are set as initial setting (step S910). At the disparity detecting unit 110, disparity from the left image L and right image R of the input image are detected, and the disparity map dM is generated (step S920). Also, disparity d within the image of the disparity map dM is analyzed by the disparity analyzing unit 120, and a cumulative frequency distribution is generated from the disparity histogram (step S930). With the set correction features and cumulative frequency distribution, the disparity of the disparity map dM is corrected with the disparity correction unit 450, and the corrected disparity map dM' is generated (step S940).

Based on the disparity of the corrected disparity map dM' thus generated, an output image is synthesized from the input image with the image synthesizing unit 160 (step S950). The synthesized output image id displayed on the image display device 40 via the display control device 30 (step S990).

Thus, according to the fifth embodiment of the present invention, the cumulative frequency distribution obtained by analyzing the disparity within an image of the disparity map dM with the disparity analyzing unit 120 is used, and the disparity correction unit 450 corrects the disparity of the input image. Thus, depth perception of the stereoscopic image can be actively modified according to the disparity within the image.

Sixth Embodiment

Disparity Conversion Device

Figure 27:
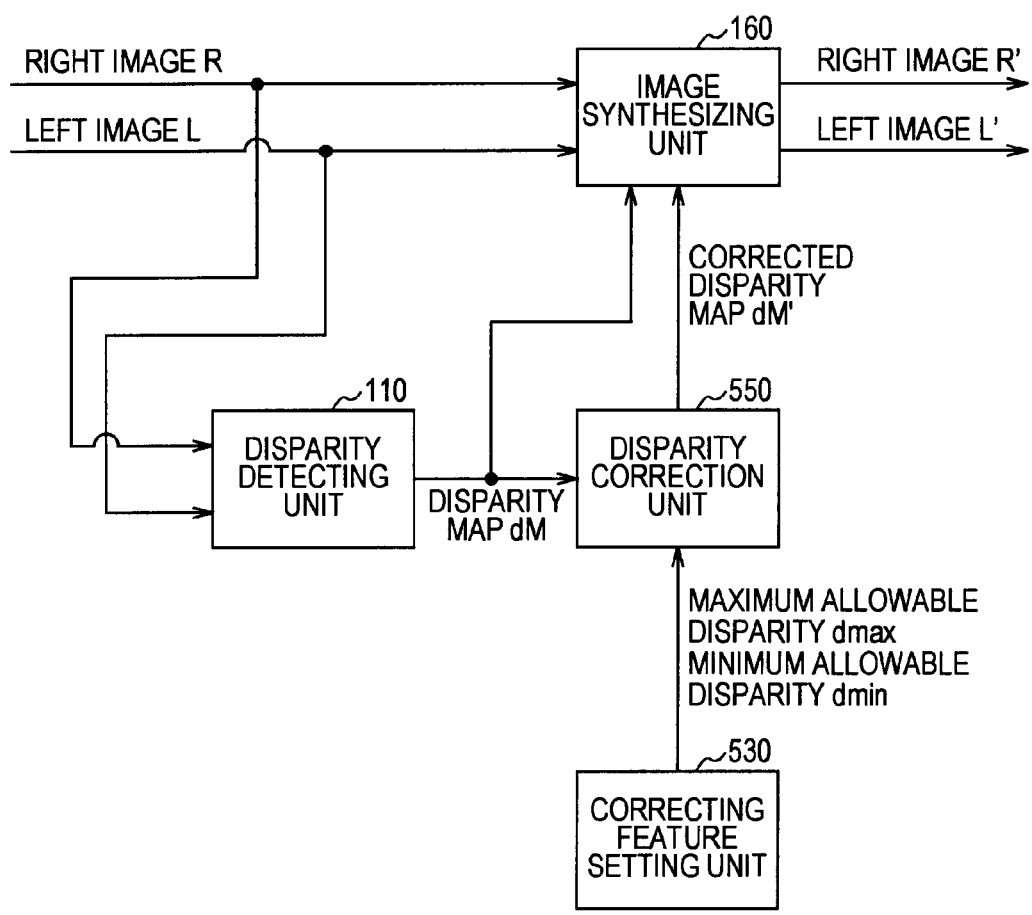
FIG. 27 is a diagram illustrating a configuration example of the disparity conversion device 100 according to a sixth embodiment of the present invention.

FIG. 27 is a diagram showing a configuration example of the disparity conversion device 100 according to a sixth embodiment of the present invention. The disparity conversion device 100 according to the sixth embodiment differs from the first embodiment in the point of setting correcting features according to component with the correcting feature setting unit 530 and performing disparity correction for each component with the disparity correction unit 550. Content of the disparity correction with the disparity correction unit 550 will be described below.

[Disparity Correction]

Figure 28:
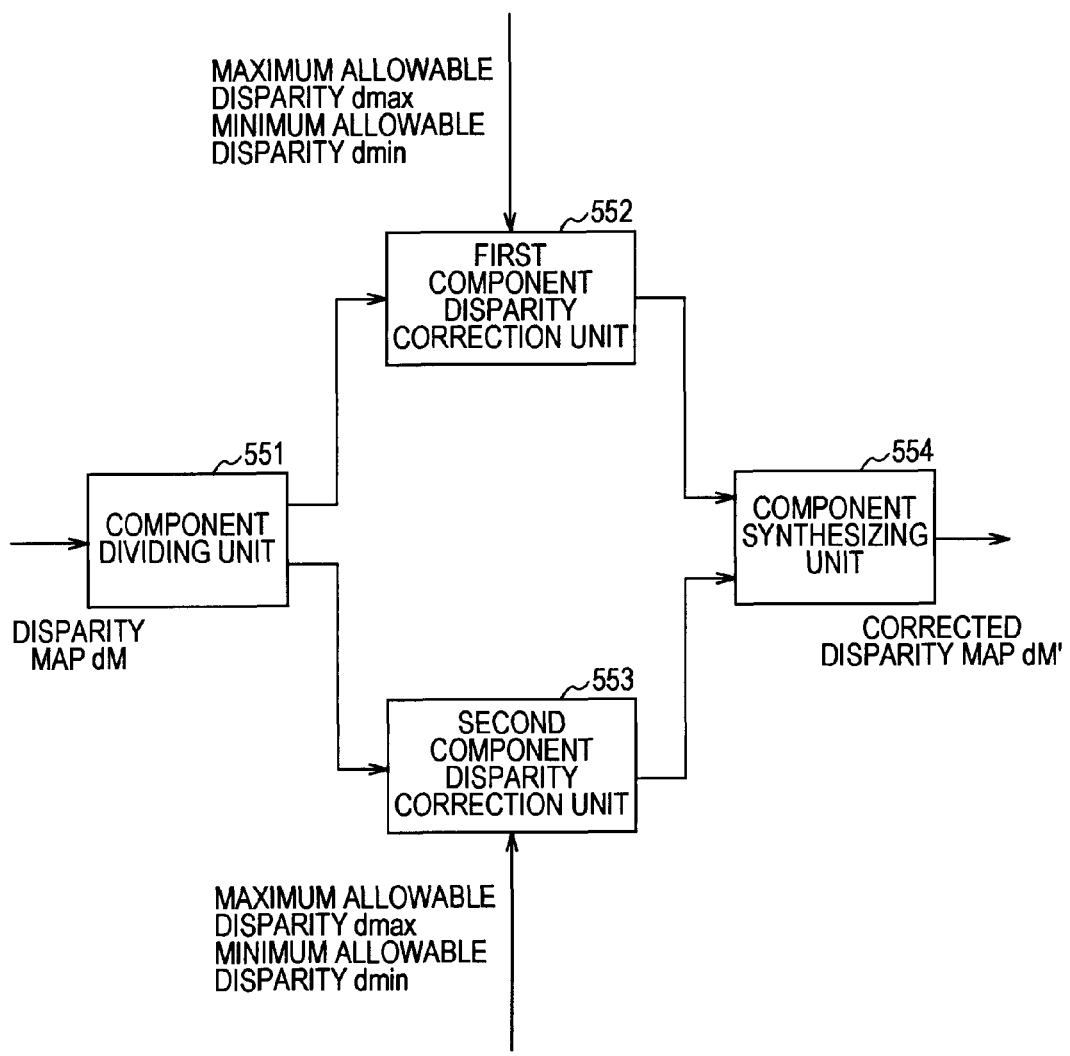
FIG. 28 is a diagram illustrating a configuration example of a disparity correction unit 550 according to the sixth embodiment of the present invention.

FIG. 28 is a diagram showing a configuration example of the disparity correction unit 550 according to the sixth embodiment of the present invention. The disparity correction unit 550 has a component dividing unit 551, first component disparity correction unit 552, second component disparity correction unit 553, and component synthesizing unit 554.

The component dividing unit 551 divides the disparity within the image of the disparity map dM by component. For example, a low frequency component serving as a broad component of the disparity is extracted, and a high frequency component as a disparity detail component. Thus, two images having different components are obtained. A normal band-dividing filter or an edge saving type filter, for example, is used as the component dividing unit 551, whereby components according to the disparity frequency components can be extracted.

The first component disparity correction unit 552 and second component disparity correction unit 553 perform disparity correction as to the various corresponding components. In the event of the disparity correction, correction is performed according to the correcting features set by the correcting features setting unit 530. For example, as to a broad component, disparity compression such as described in the first embodiment may be performed, and detail components may be saved without change and disparity correction not performed (or with disparity correction having no change before and after correction). Thus, while maintaining the detail of depth change, a dynamic range of disparity can be suppressed within the allowable range. Note that the first component disparity correction unit 552 and second component disparity correction unit 553 are an example of the component disparity correction unit described in the Claims.

The component synthesizing unit 554 synthesizes the output of the first component disparity correction unit 552 and second component disparity correction unit 553. The component synthesizing unit 554 can be realized by an adding unit, for example.

Note that it is assumed here that the component dividing unit 551 divides into two components, but is not limited to this, and division can be made into three or more components as needed, and correction performed according to the various components.

Thus, according to the sixth embodiment of the present invention, division can be made into multiple images with different components by the component dividing unit 551, and disparity correction performed by the different correcting features respectively, whereby disparity correction appropriate to the respective components can be realized. For example, by suppressing the disparity correction of a detail component, the depth change detail can be maintained, while keeping the disparity dynamic range within the allowable range.

Note that the embodiments of the present invention show an example for realizing the present invention, and as clarified in the embodiments of the present invention, the items of the embodiments of the present invention and the invention identifying items in the Claims have correlation, respectively. Similarly, invention identifying items in the Claims and items according to the embodiments of the present invention having the same names have correlation respectively. However, the present invention is not limited to the embodiments, and can be realized by performing various types of modifications to the embodiments within the scope and essence of the present invention.

Also, the processing procedures described according to the embodiments of the present invention may be retained as a method having a series of procedures, or may be retained as a program for causing a computer to execute the series of procedures herein and a recording medium that stores a program thereof. For example, a CD (Compact Disc), MD (Mini-Disc), DVD (Digital Versatile Disk), memory card, Blu-ray disc (Blu-ray Disc) or the like may be used as the recording medium herein.

REFERENCE SIGNS LIST 10 image storage device
30 display control device
40 image display device
100 disparity conversion device
110 disparity detecting unit
120 disparity analyzing unit
130, 530 correction feature setting unit
140 region setting unit
150, 450, 550 disparity correction unit
160, 260, 360 image synthesizing unit
261, 361 disparity/depth conversion unit
362 direct 3D mapping unit
263, 363 center monocular image synthesizing unit
264, 364 3D mapping unit
265, 365 stereoscopic image synthesizing unit
551 component dividing unit
552 first component disparity correction unit
553 second component disparity correction unit
554 component synthesizing unit

The invention claimed is:

1. A disparity conversion device comprising:
a disparity detecting unit that detects disparity from a left image and right image of an input image, and generates a disparity map that holds the disparity for each pixel or pixel group;
a correction feature setting unit that sets correction features in the event of correcting the disparity in said disparity map;
a disparity correction unit that corrects the disparity in said disparity map according to said set correction features and generates a corrected disparity map; and
a region setting unit that sets at least two regions in said disparity map,
wherein said correction feature setting unit sets said correction features so that, in a region corresponding to left and right edges of said disparity map of said at least two regions, depth in a forward direction is suppressed.

2. The disparity conversion device according to claim 1, wherein said disparity correction unit corrects the disparity in said disparity map according to said correction feature according to said at least two regions in said disparity map.

3. The disparity conversion device according to claim 2, wherein said disparity correction unit corrects the disparity in said disparity map according to a weighted sum of said correction features according to adjacent regions, in predetermined buffer regions of which said at least two regions are adjacent.

4. The disparity conversion device according to claim 2, further comprising an image synthesizing unit that synthesizes a left image and right image of an output image from the left image and right image of said input image according to said corrected disparity map.

5. The disparity conversion device according to claim 1, wherein said correction feature setting unit sets said correction features for each of at least two components in said disparity map;
said disparity correction unit including
a component dividing unit that divides said disparity map into each of said component,
a component disparity correction unit that corrects the disparity by component in said disparity map according to said correction feature set for each of said components, and
a component synthesizing unit that synthesizes the disparity map which has been corrected for each of said components and generates said corrected disparity map.

6. The disparity conversion device according to claim 5, wherein said components set with said correction features setting unit are components according to the disparity frequency in said disparity map.

7. The disparity conversion device according to claim 1, wherein said correction features set with said correction feature setting unit are non-linear features wherein the slope is 1 where the disparity in said disparity map nears zero, and converges into a predetermined value as the disparity in said disparity map increases.

8. The disparity conversion device according to claim 7, wherein said correction feature set with said correction features setting unit is defined based on a sigmoid function.

9. The disparity conversion device according to claim 4, wherein said image synthesizing unit comprises:
a center monocular image synthesizing unit that synthesizes a center monocular image from the left image and right image of said input image based on disparity of said disparity map;
a disparity/depth conversion unit that converts from disparity in said corrected disparity map into depth and generates a corrected depth map;
a three-dimensional mapping unit that generates a corrected three-dimensional map by mapping said center monocular image in a three-dimensional space based on said corrected depth map; and
a stereoscopic image synthesizing unit that synthesizes the right image and left image of said output image by projecting said corrected three-dimensional map on a display plane.

10. The disparity conversion device according to claim 4, wherein said image synthesizing unit comprises:
a direct three-dimensional mapping unit that generates a three-dimensional map by mapping the left image and right image of said input image in a three-dimensional space based on the disparity in said disparity map;
a center monocular image synthesizing unit that synthesizes the center monocular image by projecting said three-dimensional map on a display plane facing a virtual center eye;
a disparity/depth converting unit that converts from the disparity in said corrected disparity map into depth and generates a corrected depth map;
a three-dimensional mapping unit that generates a corrected three-dimensional map by mapping said center monocular image in a three-dimensional space based on said corrected depth map; and a stereoscopic image synthesizing unit that synthesizes the right image and left image of said output image by projecting said corrected three-dimensional map onto a display plane.

11. The disparity conversion device according to claim 1, further comprising:
    a disparity analyzing unit that analyzes the disparity in said disparity map and generates a cumulative frequency distribution of said disparity; wherein
    said disparity correction unit corrects the disparity in said disparity map based on said cumulative frequency distribution and said correcting features.

12. A stereoscopic image display system comprising:
    an input image supplying unit that supplies an input image having a left image and right image as a pair of stereoscopic images;
    a disparity detecting unit that detects disparity from a left image and right image of said input image, and generates a disparity map that holds the disparity for each pixel or pixel group;
    a correction feature setting unit that sets correction features in the event of correcting the disparity in said disparity map;
    a disparity correction unit that corrects the disparity in said disparity map according to said set correction features and generates a corrected disparity map;
    a region setting unit that sets at least two regions in said disparity map; and
    an image display device that displays said output image,
    wherein said correction feature setting unit sets said correction features so that, in a region corresponding to left and right edges of said disparity map of said at least two regions, depth in a forward direction is suppressed.

13. A disparity conversion method comprising:
    correction feature setting procedures to set correction features in the event of correcting the disparity in the disparity map holding the disparity for each pixel or pixel group;
    disparity detecting procedures that detect disparity from a left image and right image of an input image, and generates said disparity map;
    correction feature setting procedures that set correction features in the event of correcting the disparity in said disparity map;
    disparity correction procedures that correct the disparity in said disparity map according to said set correction features and generate a corrected disparity map;
    region setting procedures that set at least two regions in said disparity map; and
    image display procedures to display said output image on a display device,
    wherein said correction feature setting procedures set said correction features so that, in a region corresponding to left and right edges of said disparity map of said at least two regions, depth in a forward direction is suppressed.

* * * * *